US010971188B2

(12) United States Patent
Sun et al.

(10) Patent No.: US 10,971,188 B2
(45) Date of Patent: Apr. 6, 2021

(54) APPARATUS AND METHOD FOR EDITING CONTENT

(71) Applicant: Samsung Electronics Co., Ltd., Suwon-si (KR)

(72) Inventors: Joon-gyu Sun, Gunpo-si (KR); Han-min Bang, Suwon-si (KR); Seong-kook Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/274,907

(22) Filed: Feb. 13, 2019

(65) Prior Publication Data

US 2019/0180788 A1 Jun. 13, 2019

Related U.S. Application Data

(63) Continuation of application No. 14/969,366, filed on Dec. 15, 2015, now Pat. No. 10,373,648.

(30) Foreign Application Priority Data

Jan. 20, 2015 (KR) .......................... 10-2015-0009338

(51) Int. Cl.
*G11B 27/036* (2006.01)
*G11B 27/30* (2006.01)
(Continued)

(52) U.S. Cl.
CPC ........ *G11B 27/036* (2013.01); *G06K 9/00718* (2013.01); *G11B 27/031* (2013.01);
(Continued)

(58) Field of Classification Search
CPC .............. G06F 16/739; G06K 9/00751; G06K 9/00781; G06K 9/00718; G11B 26/036;
(Continued)

(56) References Cited

U.S. PATENT DOCUMENTS 5,031,228 A 7/1991 Lu
5,461,697 A 10/1995 Nishimura et al.
(Continued)

FOREIGN PATENT DOCUMENTS

CN 101137986 A 3/2008
CN 101783886 A 7/2010
(Continued)

OTHER PUBLICATIONS

Meng Wang et al., Movie2Comics: Towards a Lively Video Content Presentation, IEEE Transactions on Multimedia, Jun. 1, 2012, pp. 858-870, vol. 14. No. 3, IEEE Service Center. Piscataway, NJ, US, XP01144395.
(Continued)

*Primary Examiner* — David E Harvey
(74) *Attorney, Agent, or Firm* — Jefferson IP Law, LLP

(57) ABSTRACT

A system and a method for editing moving image content are provided. The method includes acquiring moving image content, mapping an image of a person included in the moving image content and speech data of the person, selecting at least one frame among frames included in the moving image content, and creating edited content of the moving image content using the mapped image and speech data, and the selected at least one frame.

16 Claims, 21 Drawing Sheets

(51) Int. Cl.
*G11B 27/34* (2006.01)
*G06K 9/00* (2006.01)
*G11B 27/031* (2006.01)
*G10L 15/26* (2006.01)
*G10L 25/51* (2013.01)

(52) U.S. Cl.
CPC .......... *G11B 27/3081* (2013.01); *G11B 27/34* (2013.01); *G06K 9/00288* (2013.01); *G10L 15/26* (2013.01); *G10L 25/51* (2013.01)

(58) Field of Classification Search
CPC ... G11B 27/3081; G11B 27/34; G11B 27/031; G11B 27/036
See application file for complete search history.

(56) References Cited

U.S. PATENT DOCUMENTS

| | | | |
|---|---|---|---|
| 5,649,060 A | 7/1997 | Ellozy et al. | |
| 5,659,662 A | 8/1997 | Wilcox et al. | |
| 5,734,794 A | 3/1998 | White | |
| 5,864,807 A | 1/1999 | Campbell et al. | |
| 6,112,172 A | 8/2000 | True et al. | |
| 6,278,451 B1 * | 8/2001 | Suzuki | A63F 13/10 715/764 |
| 6,363,380 B1 | 3/2002 | Dimitrova | |
| 6,404,925 B1 | 6/2002 | Foote et al. | |
| 6,453,284 B1 | 9/2002 | Paschall | |
| 6,463,444 B1 | 10/2002 | Jain et al. | |
| 6,516,090 B1 | 2/2003 | Lennon et al. | |
| 6,535,639 B1 * | 3/2003 | Uchihachi | G06K 9/00711 382/225 |
| 6,567,775 B1 | 5/2003 | Maali et al. | |
| 6,710,822 B1 | 3/2004 | Walker et al. | |
| 6,816,858 B1 | 11/2004 | Coden et al. | |
| 6,833,865 B1 | 12/2004 | Fuller et al. | |
| 6,925,455 B2 | 8/2005 | Gong et al. | |
| 6,928,233 B1 | 8/2005 | Walker et al. | |
| 6,970,639 B1 | 11/2005 | McGrath et al. | |
| 6,973,256 B1 | 12/2005 | Dagtas | |
| 7,073,193 B2 | 7/2006 | Marsh | |
| 7,295,752 B1 | 11/2007 | Jain et al. | |
| 7,298,930 B1 | 11/2007 | Erol et al. | |
| 7,356,830 B1 | 4/2008 | Dimitrova | |
| 7,386,799 B1 * | 6/2008 | Clanton | A63F 13/12 715/753 |
| 7,716,376 B1 * | 5/2010 | Price | G06F 1/12 709/248 |
| 8,208,792 B2 | 6/2012 | Morioka et al. | |
| 8,229,156 B1 * | 7/2012 | Yagnik | G06K 9/00744 348/571 |
| 8,375,302 B2 | 2/2013 | Oakley et al. | |
| 8,416,332 B2 | 4/2013 | Sato et al. | |
| 8,447,165 B1 | 5/2013 | Hughes | |
| 8,611,724 B2 | 12/2013 | Masutani | |
| 8,682,143 B2 * | 3/2014 | Takagi | H04N 5/76 348/135 |
| 8,699,806 B2 * | 4/2014 | Yagnik | G06K 9/00711 382/236 |
| 8,719,029 B2 | 5/2014 | Nonaka | |
| 8,819,545 B2 | 8/2014 | Nonaka | |
| 8,983,836 B2 | 3/2015 | Woodward et al. | |
| 9,007,234 B2 * | 4/2015 | Ozaki | G08G 1/096791 340/905 |
| 9,064,538 B2 | 6/2015 | Gupta et al. | |
| 9,082,306 B2 * | 7/2015 | Ozaki | G01C 21/3682 |
| 9,116,924 B2 * | 8/2015 | Marchesotti | G06K 9/00684 |
| 9,570,107 B2 | 2/2017 | Boiman et al. | |
| 9,697,230 B2 | 7/2017 | Houh et al. | |
| 9,743,033 B2 | 8/2017 | Kim et al. | |
| 9,823,824 B2 * | 11/2017 | Pasquarette | G06F 3/04845 |
| 9,953,222 B2 * | 4/2018 | Shetty | G06F 16/7834 |
| 10,380,773 B2 * | 8/2019 | Kurata | G06T 11/60 |
| 2002/0061136 A1 | 5/2002 | Shibata et al. | |
| 2002/0093591 A1 | 7/2002 | Gong et al. | |
| 2002/0186235 A1 | 12/2002 | Dimitrova et al. | |
| 2002/0188621 A1 | 12/2002 | Flank et al. | |
| 2003/0002715 A1 | 1/2003 | Kowald | |
| 2003/0068100 A1 * | 4/2003 | Covell | G06T 7/0002 382/305 |
| 2003/0085997 A1 | 5/2003 | Takagi et al. | |
| 2003/0093790 A1 | 5/2003 | Logan et al. | |
| 2003/0123850 A1 | 7/2003 | Jun et al. | |
| 2003/0154084 A1 | 8/2003 | Li et al. | |
| 2003/0177503 A1 | 9/2003 | Sull et al. | |
| 2004/0012717 A1 * | 1/2004 | Sprague | G06F 16/95 348/564 |
| 2004/0064498 A1 * | 4/2004 | Imanishi | A63F 13/22 709/201 |
| 2005/0031296 A1 | 2/2005 | Grosvenor | |
| 2005/0044500 A1 * | 2/2005 | Orimoto | H04M 1/72544 715/706 |
| 2005/0068584 A1 | 3/2005 | Kawaoka | |
| 2006/0008152 A1 | 1/2006 | Kumar et al. | |
| 2006/0059120 A1 | 3/2006 | Kiong et al. | |
| 2006/0192784 A1 | 8/2006 | Yamaji et al. | |
| 2007/0076960 A1 * | 4/2007 | Takamori | G06K 9/00288 382/224 |
| 2007/0101387 A1 | 5/2007 | Hua et al. | |
| 2007/0118873 A1 | 5/2007 | Houh et al. | |
| 2007/0168864 A1 | 7/2007 | Yamamoto et al. | |
| 2007/0177805 A1 * | 8/2007 | Gallagher | G06K 9/00288 382/190 |
| 2007/0237360 A1 | 10/2007 | Irie et al. | |
| 2007/0296863 A1 * | 12/2007 | Hwang | G11B 27/28 348/563 |
| 2008/0075431 A1 | 3/2008 | Moriya et al. | |
| 2008/0077844 A1 * | 3/2008 | Kim | G11B 27/34 715/201 |
| 2008/0118156 A1 * | 5/2008 | Okada | G06K 9/00228 382/195 |
| 2008/0186386 A1 * | 8/2008 | Okada | H04N 5/23248 348/208.4 |
| 2008/0187231 A1 | 8/2008 | Barbiere et al. | |
| 2008/0193016 A1 | 8/2008 | Lim et al. | |
| 2010/0014719 A1 * | 1/2010 | Date | G11B 27/3027 382/118 |
| 2010/0131571 A1 | 5/2010 | Reuveni | |
| 2010/0182501 A1 * | 7/2010 | Sato | G06F 16/739 348/441 |
| 2010/0188520 A1 * | 7/2010 | In | H04N 5/232 348/222.1 |
| 2010/0238323 A1 * | 9/2010 | Englund | G11B 27/034 348/239 |
| 2010/0259645 A1 * | 10/2010 | Kaplan | G11B 27/034 348/231.99 |
| 2011/0135152 A1 | 6/2011 | Kashiwagi | |
| 2011/0317984 A1 * | 12/2011 | Masutani | H04N 9/8205 386/285 |
| 2012/0014619 A1 * | 1/2012 | Tobita | H04N 21/44026 382/286 |
| 2012/0079380 A1 | 3/2012 | Tsai et al. | |
| 2012/0257876 A1 * | 10/2012 | Gupta | G11B 27/034 386/285 |
| 2013/0031479 A1 | 1/2013 | Flowers | |
| 2013/0067333 A1 | 3/2013 | Brenneman | |
| 2013/0086458 A1 * | 4/2013 | Kurata | G06T 11/60 715/202 |
| 2013/0100161 A1 * | 4/2013 | Nonaka | G06F 40/174 345/629 |
| 2013/0100166 A1 * | 4/2013 | Nonaka | G06T 11/60 345/636 |
| 2013/0166303 A1 | 6/2013 | Chang et al. | |
| 2013/0194280 A1 * | 8/2013 | Kwon | G06T 13/40 345/473 |
| 2013/0236162 A1 | 9/2013 | Kim et al. | |
| 2013/0249919 A1 * | 9/2013 | Osada | G06Q 10/10 345/472 |
| 2013/0282376 A1 * | 10/2013 | Nonaka | G06F 40/58 704/260 |

(56) References Cited

U.S. PATENT DOCUMENTS

| | | | |
|---|---|---|---|
| 2013/0283157 A1* | 10/2013 | Ebata | G06F 40/151 715/265 |
| 2013/0308922 A1 | 11/2013 | Sano et al. | |
| 2013/0326341 A1* | 12/2013 | Nonaka | G06T 11/60 715/246 |
| 2014/0075335 A1* | 3/2014 | Hicks | G06Q 10/10 715/753 |
| 2014/0081634 A1* | 3/2014 | Forutanpour | G06F 17/289 704/235 |
| 2014/0099034 A1* | 4/2014 | Rafati | G06K 9/00751 382/209 |
| 2014/0101707 A1 | 4/2014 | Kishore | |
| 2014/0169644 A1* | 6/2014 | Dockhorn | G06K 9/00221 382/118 |
| 2014/0212106 A1 | 7/2014 | Izo et al. | |
| 2014/0258911 A1* | 9/2014 | Pallakoff | G06F 3/0483 715/776 |
| 2015/0058708 A1* | 2/2015 | Georgiev | G06F 17/248 715/202 |
| 2015/0067482 A1* | 3/2015 | Georgiev | G06F 17/211 715/244 |
| 2015/0121255 A1* | 4/2015 | Lee | G06Q 10/10 715/758 |
| 2016/0029106 A1 | 1/2016 | Chen et al. | |
| 2016/0125632 A1* | 5/2016 | Yu | G06F 40/166 715/731 |
| 2016/0227282 A1 | 8/2016 | Chang et al. | |
| 2017/0032185 A1* | 2/2017 | Zhang | G06K 9/00624 |
| 2017/0093785 A1* | 3/2017 | Kii | G06F 13/00 |
| 2017/0270930 A1 | 9/2017 | Ozmeral et al. | |

FOREIGN PATENT DOCUMENTS

| | | |
|---|---|---|
| CN | 103348338 A | 10/2013 |
| JP | 2003-085572 A | 3/2003 |
| JP | 3711418 B2 | 11/2005 |
| JP | 2007-027990 A | 2/2007 |
| JP | 2007-241942 A | 9/2007 |
| JP | 4226237 B2 | 2/2009 |
| JP | 2012-249211 A | 12/2012 |
| JP | 5353835 B2 | 11/2013 |
| KR | 10-2012-0126412 A | 11/2012 |
| KR | 10-1244789 B1 | 3/2013 |
| WO | 00/16243 A1 | 3/2000 |

OTHER PUBLICATIONS

Chinese Office Action dated Aug. 5, 2019, issue in Chinese Patent Application No. 201580074063.4.

Chinese Office Action dated Dec. 27, 2019, issued in Chinese Application No. 201580074063.4.

Korean Office Action dated Jan. 18, 2021, issued in Korean Patent Application No. 10-2015-0009338.

* cited by examiner

APPARATUS AND METHOD FOR EDITING CONTENT

CROSS-REFERENCE TO RELATED APPLICATION(S)

This application is a continuation application of prior application Ser. No. 14/969,366, filed on Dec. 15, 2015, which claimed priority under 35 U.S.C § 119(a) of a Korean patent application number 10-2015-0009338, filed on Jan. 20, 2015, in the Korean Intellectual Property Office, the disclosure of which is incorporated by reference herein in its entirety.

TECHNICAL FIELD

The present disclosure relates to an apparatus and method for editing content. More particularly, the present disclosure relates to an apparatus and method for editing moving image content based on an image and speech of a person in the content.

BACKGROUND

As multimedia and network technologies have developed, it has become possible for a user to create his/her desired content or to receive various content from another terminal or service sever to use the content. However, as the number of pieces of content to be used by users increases, users have difficulty effectively selecting content that they will use. Thus a technique for editing details of content and providing editing information has been developed. However, a technique for providing editing information of the related art involves simply combining some of existing media, and thus it is difficult for users to be aware of details of content in a comfortable and familiar manner. Accordingly, a content editing technique is desired to efficiently enable users to be aware of details of content and use the editing information in a familiar manner.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for editing content in which edited content may be created using an image and speech data of a person included in moving image content.

Another aspect of the present disclosure is to provide an apparatus and method for editing content in which a scene and a frame used to create the edited content may be selected using voice data of the moving image content.

Another aspect of the present disclosure is to provide an apparatus and method for editing content in which the edited content may be created using a different template depending on a type of the edited content.

In accordance with an aspect of the present disclosure, a method of a content editing apparatus for editing moving image content is provided. The method includes acquiring moving image content, mapping an image of a person included in the moving image content and speech data of the person, selecting at least one of frames included in the moving image content, and creating edited content of the moving image content using the mapped image and speech data, and the selected at least one frame.

The mapping of the image of the person included in the moving image content and speech data of the person may include classifying face images of persons in the moving image content for each person and mapping the classified face images to speech data of the persons.

The speech data may include at least one of voice data of the person and text data converted from the voice data.

The selecting of the at least one frame among frames included in the moving image content may include determining at least one scene among scenes of the moving image content using voice data in the moving image content, and selecting at least one frame among frames included in the determined scene.

The determining of the at least one scene among scenes of the moving image content may include determining at least one scene among the scenes based on a voice level variation and a voice frequency variation of the voice data in the moving image content.

The determining of the at least one scene among scenes of the moving image content may include detecting a predetermined voice in the moving image content, and determining a scene corresponding to a position at which a predetermined condition is satisfied based on a position of the detected voice.

The predetermined voice may include a burst sound, and the scene corresponding to the position at which the predetermined condition is satisfied may be a scene ranging between a portion of the moving image content in which the burst sound is output and another portion of the moving image content spaced apart a certain distance in a reverse direction.

The selecting of the at least one frame may include selecting the at least one frame according to a level of noise included in the frames included in the determined scene.

The selecting of the at least one frame may include selecting at least one frame based on at least one of a line-of-sight direction, a face direction, and a facial expression of persons included in the frames included in the determined scene.

The creating of the edited content may further include determining a template used to create the edited content, and inserting an image of the selected frame into the determined template.

Text converted from a voice uttered by a person included in the image of the frame may be displayed in the image inserted into the template.

The determining of the template may include determining a type of the edited content and selecting a template corresponding to the determined type, and the image inserted into the template may be processed according to the type of the edited content.

In accordance with another aspect of the present disclosure, a content editing apparatus for editing moving image content is provided. The content editing apparatus includes a storage unit configured to map and store an image of a person included in the moving image content and speech data of the person, and a controller configured to select at least one frame among frames included in the moving image content, and to create edited content of the moving image content using the mapped image and speech data, and the at least one selected frame.

The controller may classify face images of persons in the moving image content for each person and may map and store the classified face images and speech data of the persons in the storage unit.

The speech data may include at least one of voice data of the person and text data converted from the voice data.

The controller may determine at least one scene among scenes of the moving image content using voice data in the moving image content and may select at least one frame among frames included in the determined scene.

The controller may determine at least one scene among the scenes based on a voice level variation and a voice frequency variation of the voice data in the moving image content.

The controller may detect a predetermined voice in the moving image content and may determine a scene corresponding to a position at which a predetermined condition is satisfied based on a position of the detected voice.

The predetermined voice may include a burst sound, and the scene corresponding to the position at which the predetermined condition is satisfied may be a scene ranging between a portion of the moving image content in which the burst sound is output and another portion of the moving image content spaced apart a certain distance in a reverse direction.

The controller may select the at least one frame according to a level of noise included in the frames included in the determined scene.

The controller may select the at least one frame based on at least one of a line-of-sight direction, a face direction, and a facial expression of persons included in the frames included in the determined scene.

The controller may determine a template used to create the edited content and may insert an image of the selected frame into the determined template.

Text converted from a voice uttered by a person included in the image of the frame may be displayed in the image inserted into the template.

The controller may determine a type of the edited content and may select a template corresponding to the determined type, and the image inserted into the template may be processed according to the type of the edited content.

In accordance with another aspect of the present disclosure, a non-transitory computer readable recording medium is provided. The non-transitory computer readable recording medium stores a computer program for executing by a processor the above-described method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, when one part (or element, device, etc.) is referred to as being "connected" to another part (or element, device, etc.), it should be understood that the former can be "directly connected" to the latter, or "electrically connected" to the latter via an intervening part (or element, device, etc.). Furthermore, when one part is referred to as "comprising (or including or having)" other elements, it should be understood that it can comprise (or include or have) only those elements, or other elements as well as those elements if there is no specific limitation.

In the present disclosure, the term "edited content" may denote secondary content that is created by editing primary content. For example, the edited content may be secondary content created by summarizing details of primary content. For example, a content editing apparatus may create the edited content by extracting a portion of moving image content and using the portion to summarize details of the moving image content. For example, a content editing apparatus may create the edited content by processing a portion of moving image content or adding new data to the portion of the moving image content. However, embodiments of the present disclosure are not limited thereto.

Hereinafter, embodiments of the present disclosure will be described in detail with reference to the accompanying drawings.

Figure 1:
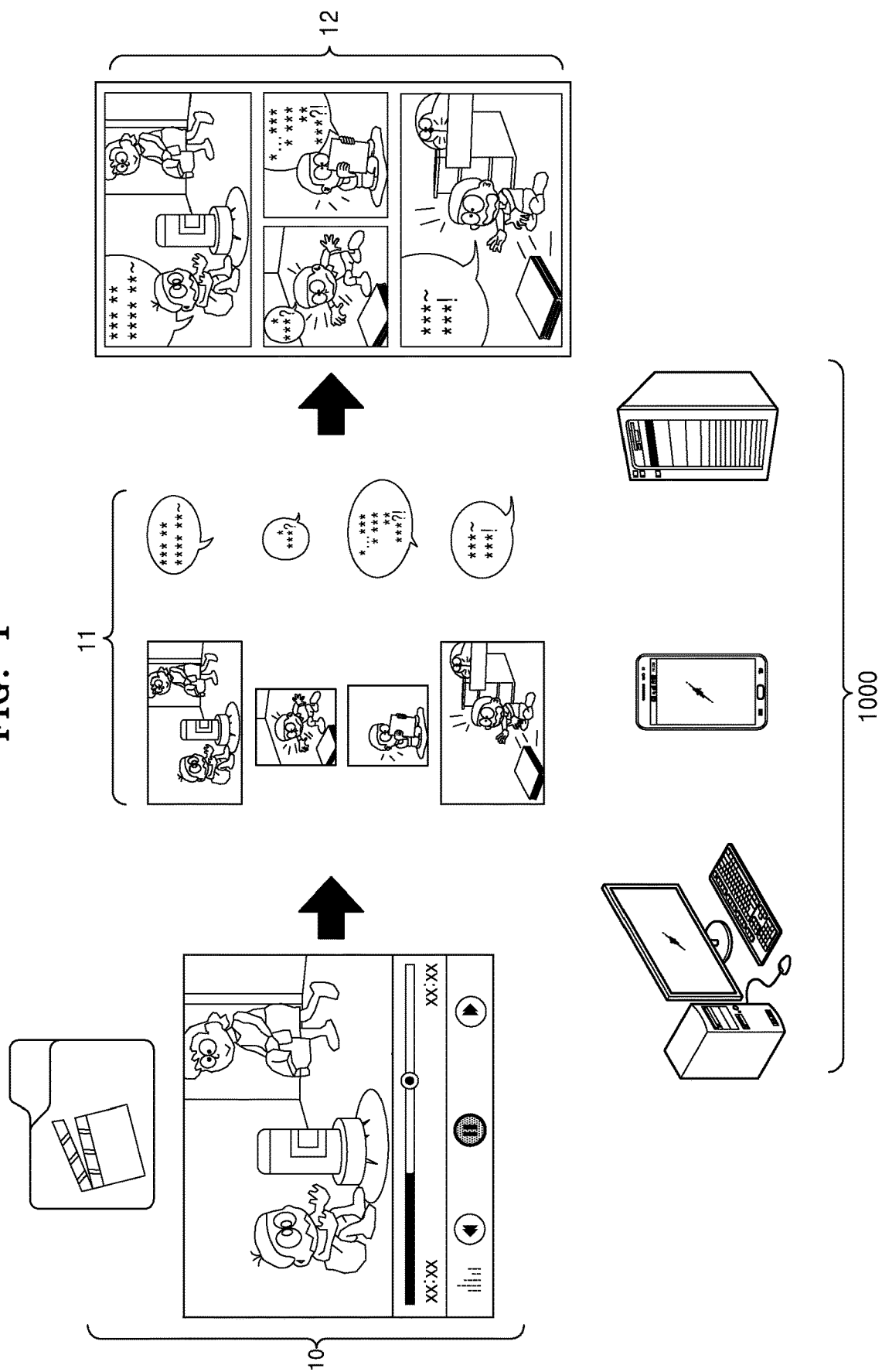
FIG. 1 is a schematic diagram illustrating a method of a content editing apparatus creating edited content of moving image content according to various embodiments of the present disclosure.

FIG. 1 is a schematic diagram illustrating a method of a content editing apparatus 1000 creating edited content 12 of moving image content according to various embodiments of the present disclosure.

Referring to FIG. 1, the content editing apparatus 1000 may create editing information 11 for moving image content 10 by combining images representing specific scenes of the moving image content 10 and displaying text representing a dialog between persons in an image on the image. The editing information 11 for the moving image content 10 is information created by editing the moving image content 10 and, for example, may be created by summarizing details of the moving image content, but is not limited thereto.

The content editing apparatus 1000 may create the edited content 12 including an image representing a scene selected from among scenes of the moving image content 10 and speech data of a person included in the image and may use the created image and speech data to create editing information 11 for the moving image content 10. The speech data may include at least one of voice data uttered by a person and text data converted from the voice data. In addition, the speech data may include playback position information corresponding to voice data and text data. The playback position information may indicate, for example, a playback time at which a frame corresponding to the voice data and text data is played back in an entire playback time of the moving image content 10.

In order to create the edited content 12, the content editing apparatus 1000 may create a face image database (DB) by classifying face images by person in the moving image content 10 and may create a speech DB by classifying speech data associated with a voice uttered by the person. In addition, the content editing apparatus 1000 may map the face image in the face image DB and the speech data in the speech DB.

The content editing apparatus 1000 may include all devices for performing image processing. Examples of the content editing apparatus 1000 may be a device or server. The device may include, but is not limited to, a smartphone, a tablet personal computer (PC), a PC, a smart television (TV), a cell phone, a personal digital assistant (PDA), a laptop, a media player, a micro server, a global positioning system (GPS) device, an e-book terminal, a digital broadcasting terminal, a navigation, a kiosk, a Moving Picture Experts Group phase 1 or phase 2 (MPEG-1 or MPEG-2) audio layer 3 (MP3) player, a digital camera, a home appliance, and another mobile or non-mobile computing device. In addition, the device may be a wearable device, such as a wrist watch, eyeglasses, a hair band, and a ring which include a communication function and a data processing function. In addition, the service may be a server of a service provider that provides a specific service. Examples of the service may include a service using moving image data, such as a broadcasting service, a content sharing service, a content providing service, a game providing service, a chatting service, a search service, a call service, a photograph capturing service, and a moving image playback service. However, embodiments of the present disclosure are not limited thereto.

Figure 2:
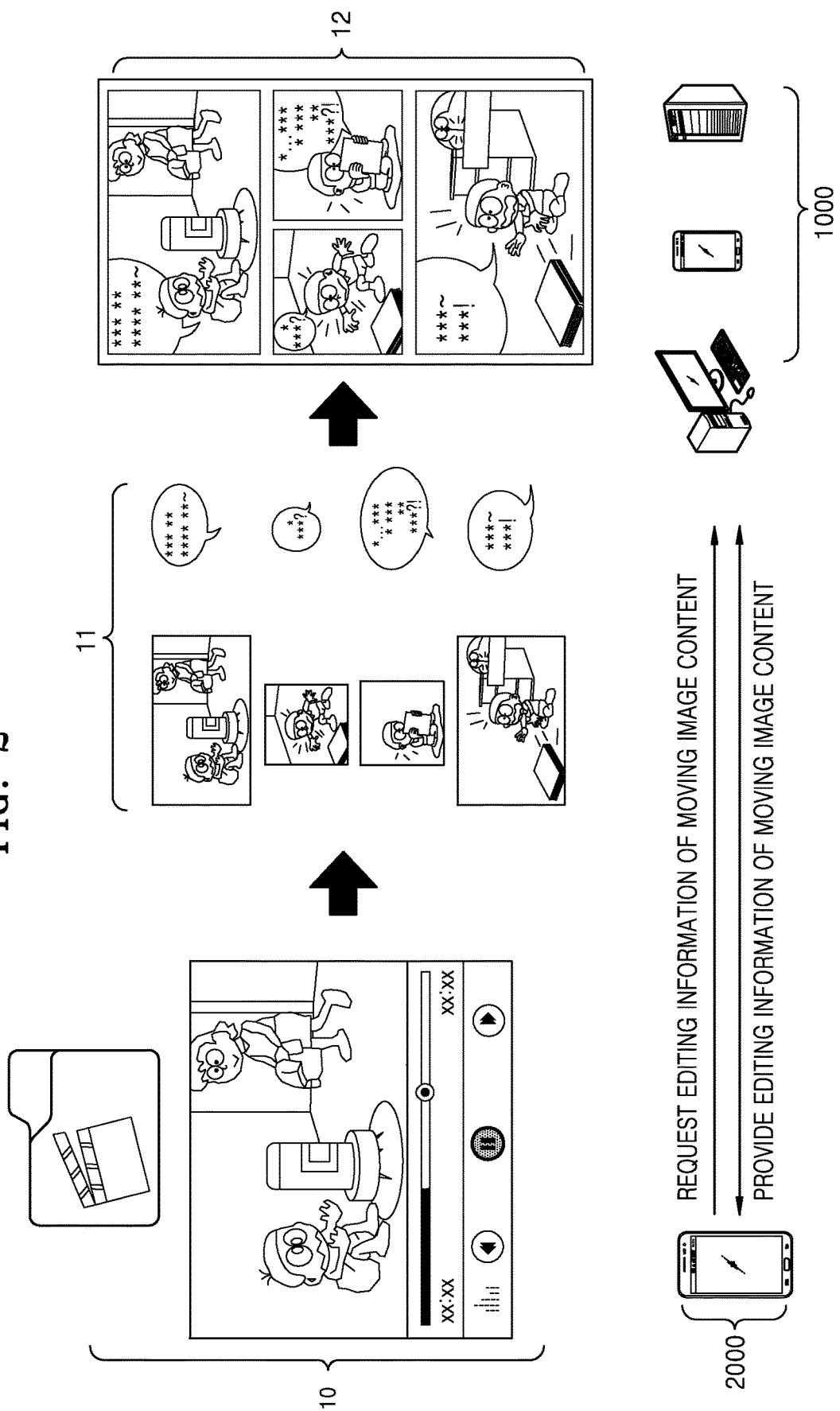
FIG. 2 is a diagram illustrating an example in which a content editing apparatus provides edited content to a device in response to a request from the device according to various embodiments of the present disclosure.

FIG. 2 is a diagram illustrating an example in which a content editing apparatus 1000 provides edited content 12 to a device 2000 in response to a request from the device 2000 according to various embodiments of the present disclosure.

Referring to FIG. 2, the content editing apparatus 1000 may be communicatively connected with the device 2000 through the network. The content editing apparatus 1000 may receive a request for editing information 11 for moving image content 10 from the device 2000 and may create edited content 12 of the requested moving image content 10 and provide the created edited content 12 to the device 2000. While transmitting an identification value of the moving image content 10 to the content editing apparatus 1000 or transmitting the moving image content 10 to the content editing apparatus 1000, the device 2000 may request the edited content 12 of the moving image content 10 from the content editing apparatus 1000. In this case, the device 2000 may request the content editing apparatus 1000 to provide the edited content 12 according to a user input.

In addition, the content editing apparatus 1000 may receive information for creating the edited content 12, such as selection of a scene in the moving image content 10 and selection of a type of the edited content 12, from the device 2000 and may create the edited content 12 according to the received information.

In addition, the content editing apparatus 1000 may store the created edited content 12 in a DB corresponding to an account of a user of the device 2000 and may provide the edited content 12 stored in the DB to the device 2000.

Figure 3:
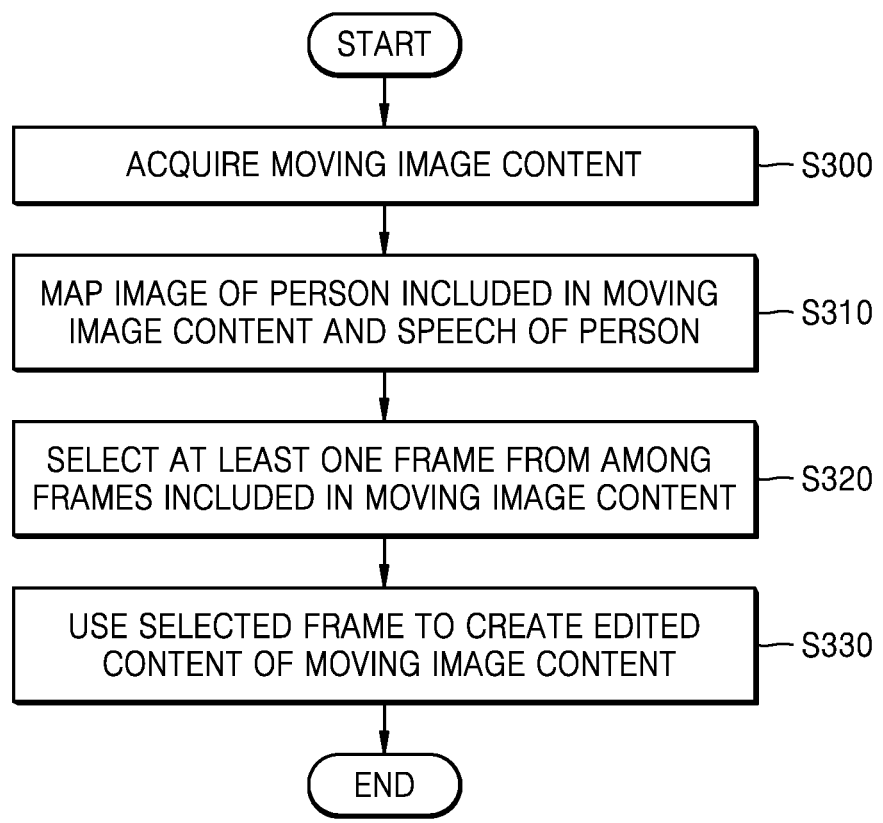
FIG. 3 is a flowchart illustrating a method of a content editing apparatus creating edited content according to various embodiments of the present disclosure.

FIG. 3 is a flowchart illustrating a method of a content editing apparatus 1000 creating edited content according to various embodiments of the present disclosure.

Referring to FIG. 3, in operation S300, the content editing apparatus 1000 may acquire moving image content. The moving image content may be content stored in the content editing apparatus 1000. The content stored in the content editing apparatus 1000 may be content received by the content editing apparatus 1000 from the outside or content produced by the content editing apparatus 1000. In addition, the moving image content may be content uploaded from the content editing apparatus 1000 or one user device (not shown) to an external server (e.g., a cloud server) or another user device (not shown). The moving image content may be content reproduced by an external server.

The content editing apparatus 1000 may extract the moving image content stored in the content editing apparatus 1000. The content editing apparatus 1000 may receive the moving image content stored in the device 2000 or the external server from the device 2000 or the external server.

In operation S310, the content editing apparatus 1000 may map an image of a person included in the moving image content and speech data of the person. The content editing apparatus 1000 may extract face images of persons included in the moving image content from frames of the moving image content. The content editing apparatus 1000 may use a media data format converter in the content editing apparatus 1000 to create an image from the moving image content and may recognize a face of a person in the created image and extract a face image of the person. The content editing apparatus 1000 may classify the extracted face images by person.

In addition, the content editing apparatus 1000 may extract voice data regarding speech of persons included in the moving image content from the moving image content and convert the extracted voice data into text data. The content editing apparatus 1000 may use a media data extractor (not shown) in the content editing apparatus 1000 to extract the voice data from the moving image content. In addition, the content editing apparatus 1000 may convert the extracted voice data into text data. The speech data may include at least one of the extracted voice data and the converted text data. The content editing apparatus 1000 may classify the speech data by speaker.

In addition, the content editing apparatus 1000 may map the classified face image and the classified speech data. The content editing apparatus 1000 may map an image and speech data of a specific person. The content editing apparatus 1000 may mutually map or group face images and speech data which are determined to belong to the same person among the face images stored in the face image DB and the speech data stored in the speech DB.

In addition, the content editing apparatus 1000 may determine a facial expression of a person by analyzing an image of the person and may determine details (meanings) of speech of the person by analyzing voice data and text converted from the voice data.

In operation S320, the content editing apparatus 1000 may select at least one frame from among frames included in the moving image content. The content editing apparatus 1000 may select a scene to be used to create edited content from among scenes included in the moving image content. The content editing apparatus 1000 may select at least one frame from among frames corresponding to the selected scene according to a predetermined criterion.

In operation S330, the content editing apparatus 1000 may use the selected frame to create edited content of the moving image content. The content editing apparatus 1000 may acquire a template of the edited content and may create the edited content by inserting an image of the selected frame into the template. In addition, the content editing apparatus 1000 may extract speech data of the person in the image of the selected frame from the DB based on the face image of the person in the image of the selected frame. In addition, the content editing apparatus 1000 may use the extracted speech data to insert text representing what is uttered by the person into the image of the selected frame in the vicinity of the person.

Figure 4:
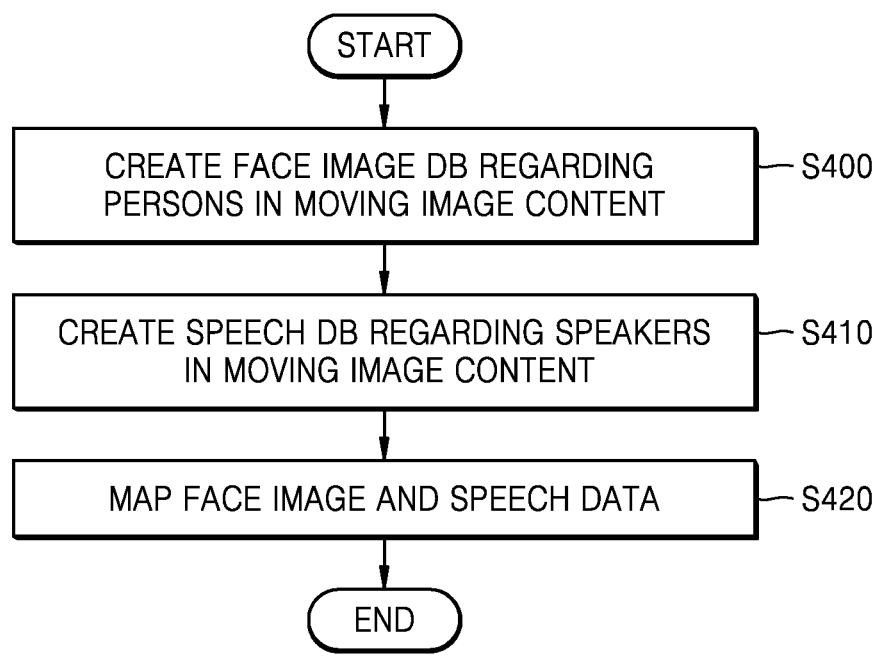
FIG. 4 is a flowchart illustrating a method of a content editing apparatus mapping a face image and speech data according to various embodiments of the present disclosure.

FIG. 4 is a flowchart illustrating a method of a content editing apparatus 1000 mapping a face image and speech data according to various embodiments of the present disclosure.

Referring to FIG. 4, in operation S400, the content editing apparatus 1000 may create a face image DB regarding persons in moving image content. The content editing apparatus 1000 may acquire face images from the moving image content and extract feature values of the acquired face images. In addition, the content editing apparatus 1000 may create the face image DB by grouping the face images for each person based on the extracted feature values.

In operation S410, the content editing apparatus 1000 may create a speech DB regarding speakers in the moving image content. The content editing apparatus 1000 may collect voice data from the moving image content and extract feature values of the collected voice data. In addition, the content editing apparatus 1000 may group the voice data for each speaker based on the extracted feature values. The content editing apparatus 1000 may convert the voice data into text and map the text to the voice data. The content editing apparatus 1000 may create the speech DB by classifying and storing the speech data including at least one of the voice data and the text data for each speaker.

In operation S420, the content editing apparatus 1000 may map the face image and the speech data. The content editing apparatus 1000 may map face images of a person and speech data of a speaker. The person and the speaker may be the same person. Thus the face images and the speech data which are determined to belong to the same person may be mapped to each other. The content editing apparatus 1000 may create a mapping table by mapping the face images and the speech data which are determined to belong to the same person.

In addition, if the person in the moving image content is a celebrity, in order to enhance a face recognition function, the content editing apparatus 1000 may map images of persons provided from various service servers (not shown) to the face image DB.

The content editing apparatus 1000 may determine an emotional state corresponding to the face image and the speech data of the person. The content editing apparatus 1000 may determine the emotional state corresponding to the face image and the speech data of the person by analyzing the face image of the person and the speech data corresponding to the face image. For example, the content editing apparatus 1000 may determine the emotion of the person by analyzing a facial expression of the person, a meaning of speech of the person, and a level and frequency of a voice of the person. In addition, the content editing apparatus 1000 may map and store information indicating the determined emotion and the face image and speech data of the person.

Figure 5:
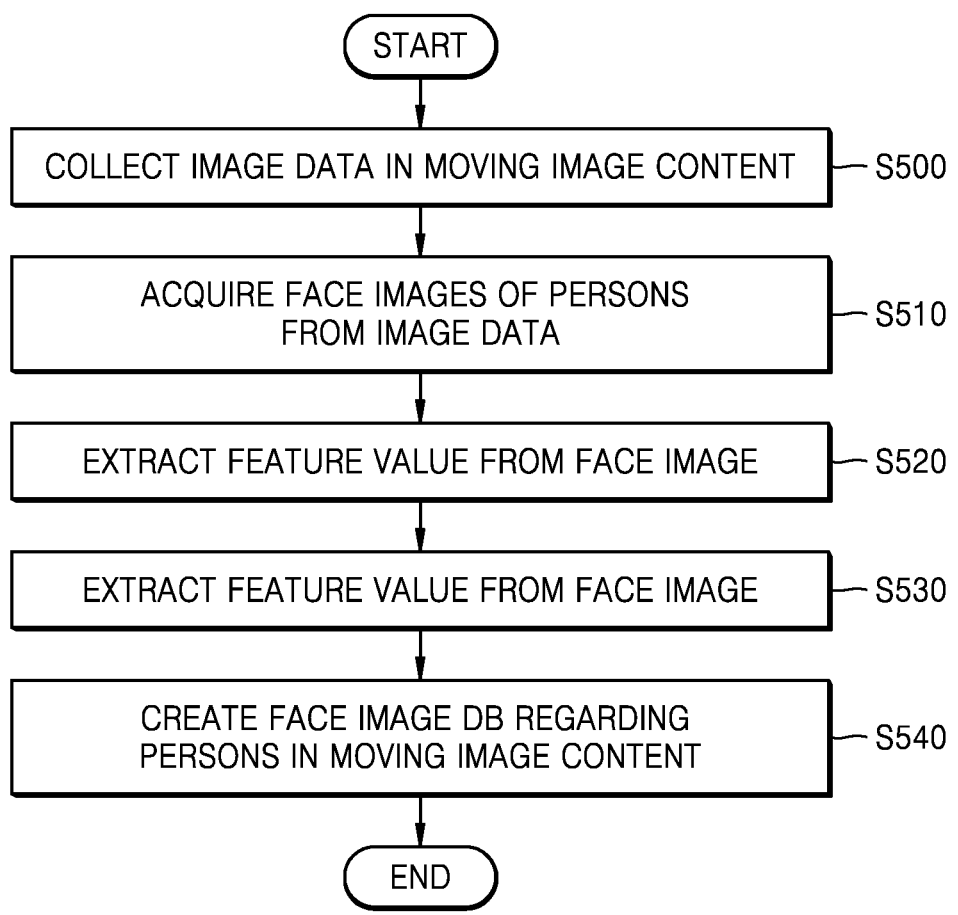
FIG. 5 is a flowchart illustrating a method of creating a face image database (DB) according to various embodiments of the present disclosure.

FIG. 5 is a flowchart illustrating a method of creating a face image DB according to various embodiments of the present disclosure.

Referring to FIG. 5, in operation S500, the content editing apparatus 1000 may acquire image data in moving image content. The content editing apparatus 1000 may acquire the image data from frames included in the moving image content. For example, the content editing apparatus 1000 may acquire the image data by extracting the image data included in the frames included in the moving image content. In addition, the content editing apparatus 1000 may acquire the image data by using the frames included in the moving image content to capture an image displayed on a screen of the content editing apparatus 1000. When the content editing apparatus 1000 captures the image, the content editing apparatus 1000 may be a device including a display. However, the method of the content editing apparatus 1000 acquiring image data is not limited thereto.

In operation S510, the content editing apparatus 1000 may acquire face images of persons from the image data. The content editing apparatus 1000 may acquire the face images of persons in the moving image content using the image data. For example, the content editing apparatus 1000 may acquire each face image by extracting image data having facial attributes from the image data. For example, the content editing apparatus 1000 may acquire the face image by cutting the face image out of the image data through face recognition. However, embodiments of the present disclosure are not limited thereto. The face image may be an image representing a face of one person.

In operation S520, the content editing apparatus 1000 may extract a feature value from the face image. The feature value for the face image is a value representing a feature of the face image and, for example, may represent a feature such as shape, color, and size of objects included in the face image. In addition, for example, the content editing apparatus 1000 may extract a feature value regarding positions of and spaces between the objects included in the face image. The objects included in the face image may include, for example, a head, hair, an eye, a nose, a mouth, and an ear. In addition, the feature value may be, for example, a feature vector value. However, embodiments of the present disclosure are not limited thereto.

In operation S530, the content editing apparatus 1000 may classify face images based on the feature value. The content editing apparatus 1000 may classify the face images by grouping face images having similar feature values. The content editing apparatus 1000 may group face images determined to be images representing a face of the same person by comparing the feature values of the face images. The feature values and similarities between the feature values may be predetermined as criteria for the content editing apparatus 1000 to determine that the face images represent the face of the same person.

In operation S540, the content editing apparatus 1000 may create a face image DB regarding persons in moving image content. The content editing apparatus 1000 may create the face image DB by storing face images for each person. The face image DB may include not only the face images but also feature values of the face images, but is not limited thereto. The face image DB may further include information regarding playback positions of frames including the face images.

Figure 6:
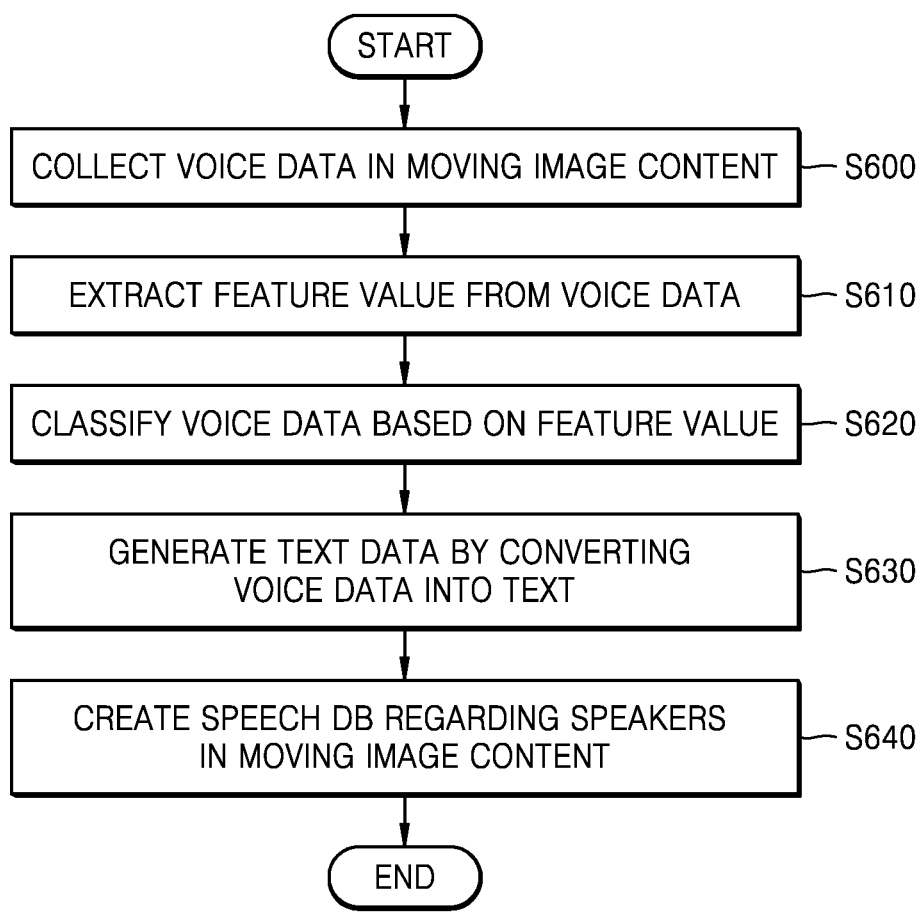
FIG. 6 is a flowchart illustrating a method of creating a speech DB according to various embodiments of the present disclosure.

FIG. 6 is a flowchart illustrating a method of creating a speech DB according to various embodiments of the present disclosure.

Referring to FIG. 6, in operation S600, the content editing apparatus 1000 may acquire voice data in moving image content. The content editing apparatus 1000 may acquire the voice data from frames included in the moving image content. For example, the content editing apparatus 1000 may acquire the voice data by extracting the voice data included in the frames included in the moving image content.

In operation S610, the content editing apparatus 1000 may extract a feature value from the voice data. For example, the content editing apparatus 1000 may extract a feature value for the voice data. The feature value for the voice data indicates a feature of the voice data and, for example, may include a feature such as amplitude, frequency, and tone of the voice. In addition, the feature value may be, for example, a feature vector value. However, embodiments of the present disclosure are not limited thereto.

In operation S620, the content editing apparatus 1000 may classify the voice data based on the feature value. The content editing apparatus 1000 may classify the voice data by grouping voice data having similar feature values. The content editing apparatus 1000 may group the voice data determined to be voice data of the same speaker by comparing the feature values of the voice data. The feature values and similarities between the feature values may be predetermined as criteria for the content editing apparatus 1000 to determine that the voice data represents the voice of the same person.

In operation S630, the content editing apparatus 1000 may generate text data by converting the voice data into text. The content editing apparatus 1000 may convert the voice data into the text using a speech-to-text (STT) technique.

In operation S640, the content editing apparatus 1000 may create a speech DB regarding speakers in the moving image content. The content editing apparatus 1000 may create the speech DB by storing at least one of the voice data and the text data for each person. The speech DB may include not only the voice data and the text data but also feature values of the voice data, but is not limited thereto. In addition, the speech DB may include information regarding playback positions of frames corresponding to the voice data and the text data.

Figure 7:
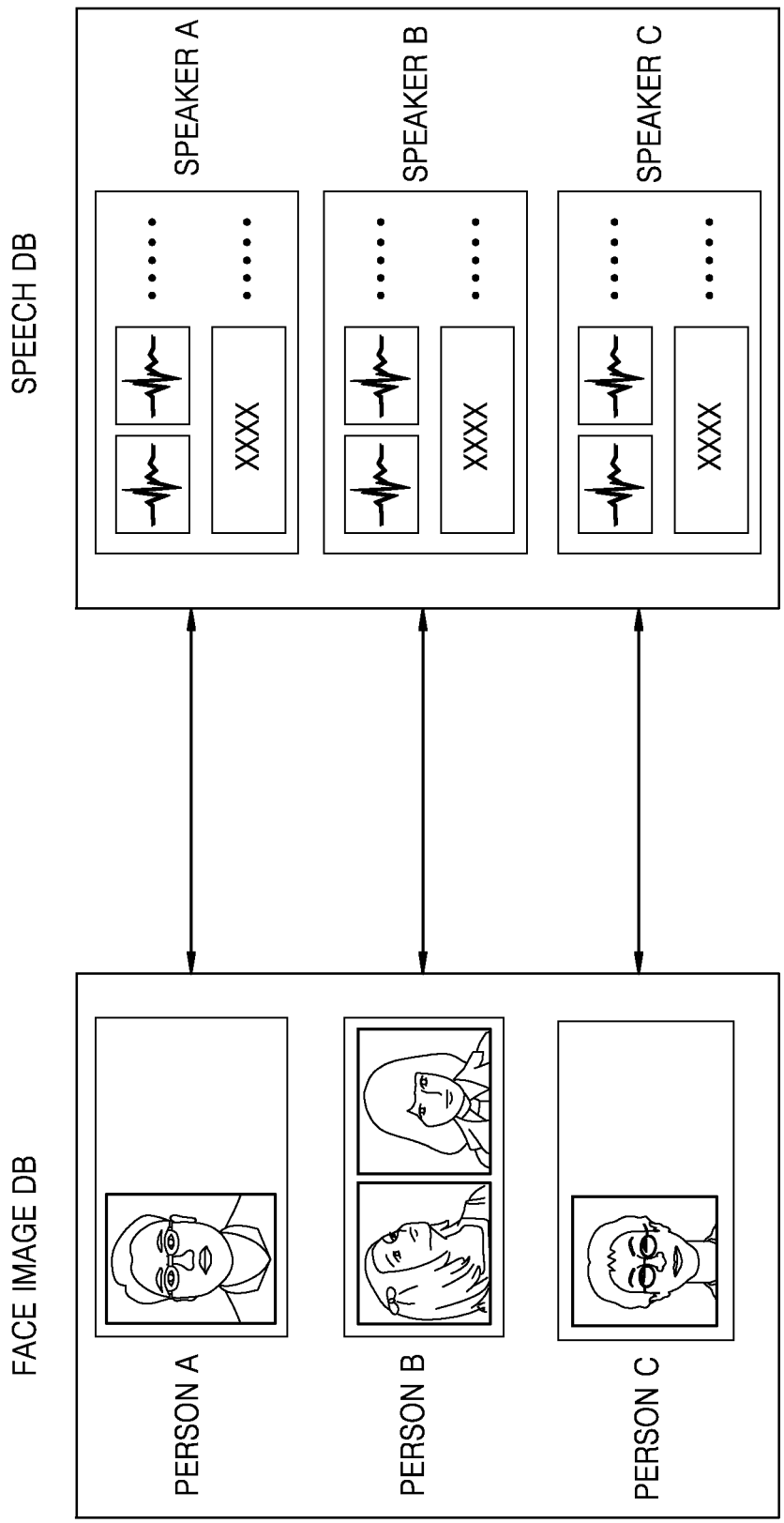
FIG. 7 is a diagram illustrating an example in which a face image created from moving image content is mapped to speech data according to various embodiments of the present disclosure.

FIG. 7 is a diagram illustrating an example in which a face image created from moving image content is mapped to speech data according to various embodiments of the present disclosure.

Referring to FIG. 7, a face image of person A, face images of person B, and a face image of person C may be classified and stored in the face image DB. In addition, voice data and text data of speaker A, voice data and text data of speaker B, and voice data and text data of speaker C may be classified and stored in the speech DB.

In addition, person A may be mapped to speaker A, person B may be mapped to speaker B, and person C may be mapped to speaker C. In addition, person A and speaker A may be the same person, person B and speaker B may be the same person, and person C and speaker C may be the same person.

Figure 8:
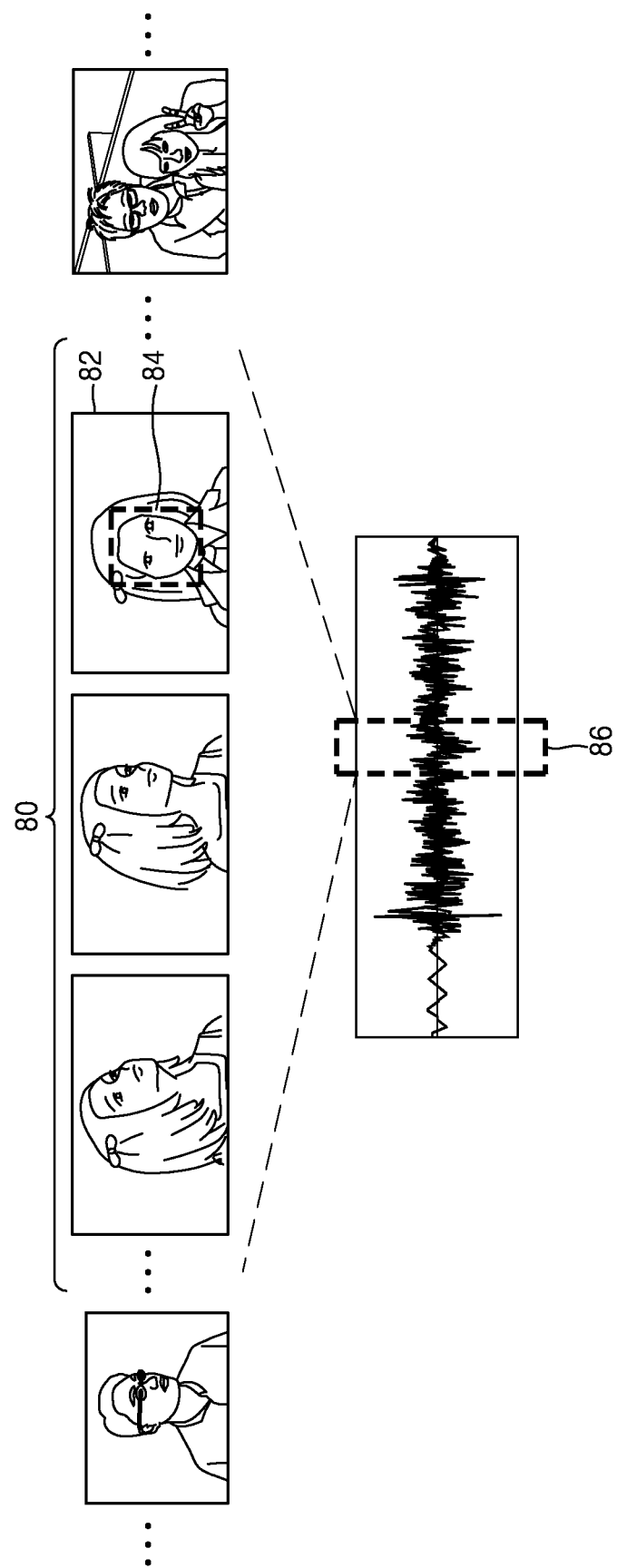
FIG. 8 is a diagram illustrating an example in which a face image and voice data are mapped to each other according to various embodiments of the present disclosure.

FIG. 8 is a diagram illustrating an example in which a face image and voice data are mapped to each other according to various embodiments of the present disclosure.

Referring to FIG. 8, the content editing apparatus 1000 may extract a face image 84 from a frame 82 included in a first scene 80 of moving image content. In addition, the content editing apparatus 1000 may extract voice data 86 output in the first scene 80. The content editing apparatus 1000 may analyze movement of person A included in the first scene 80 in order to extract the voice data 86. For example, the content editing apparatus 1000 may analyze movement of a mouth of person A in the first scene 80 and extract the voice data 86 output in the first scene 80 while the mouth of person A moves.

In addition, the content editing apparatus 1000 may map the extracted voice data 86 to the extracted face image 84. In addition, the content editing apparatus 1000 may determine that a speaker of the voice data 86 and person A of the extracted face image 84 are the same person.

Figure 9:
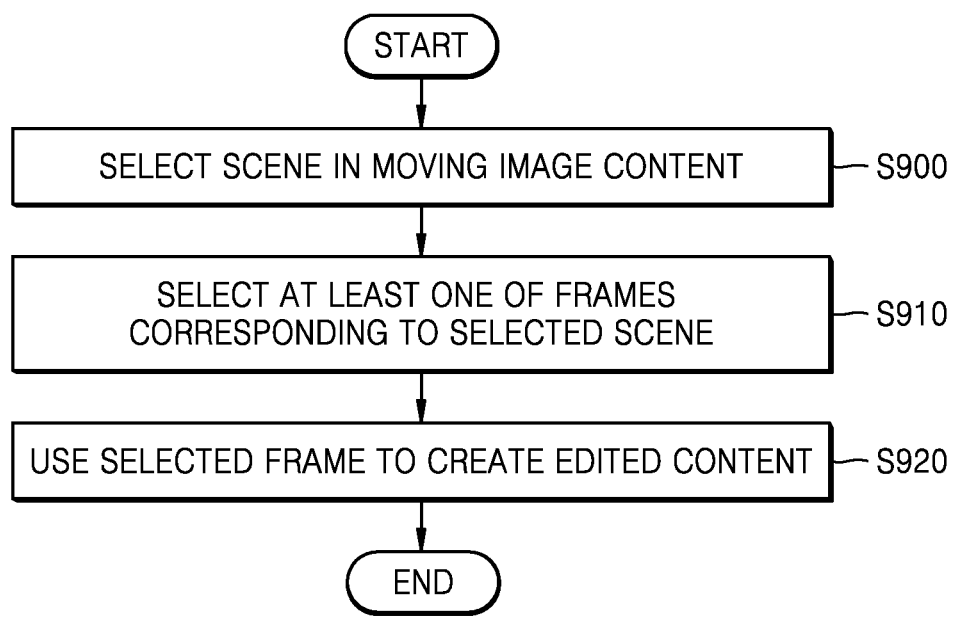
FIG. 9 is a flowchart illustrating a method of a content editing apparatus selecting a scene in moving image content and creating edited content according to various embodiments of the present disclosure.

FIG. 9 is a flowchart illustrating a method of a content editing apparatus 1000 selecting a scene in moving image content and creating edited content according to various embodiments of the present disclosure.

Referring to FIG. 9, in operation S900, the content editing apparatus 1000 may select a scene in moving image content. The content editing apparatus 1000 may recommend a scene to be used to create edited content by analyzing a voice of the video content. The content editing apparatus 1000 may analyze a feature of a voice based on a level and a frequency of the voice and may recommend a scene in the vicinity of a frame including voice data having a predetermined feature. The content editing apparatus 1000 may provide the recommended scene to the device 2000 or display the recommended scene on a screen of the content editing apparatus 1000. In addition, the content editing apparatus 1000 may select at least one of recommended scenes according to a user's selection. Thus, the content editing apparatus 1000 may select a highlighted scene in the moving image content.

In operation S910, the content editing apparatus 1000 may select at least one of frames corresponding to the selected scene. The content editing apparatus 1000 may select a frame including a predetermined person from among frames constituting the selected scene. In addition, the content editing apparatus 1000 may select a frame having little noise from among the frames constituting the selected scene. However, embodiments of the present disclosure are not limited thereto. The content editing apparatus 1000 may select the frame according to various criteria.

In operation S920, the content editing apparatus 1000 may use the selected frame to create edited content. The content editing apparatus 1000 may acquire a template used in order to create the edited content and may insert an image of the selected frame into the acquired template. The template for creating the edited content may be predetermined according to the type of the edited content.

In addition, the content editing apparatus 1000 may acquire text data of a voice uttered by a person in the selected frame. The content editing apparatus 1000 may extract a face image of the person in the selected frame and may extract text data corresponding to the extracted face image from the speech DB.

In addition, the content editing apparatus 1000 may insert the extracted text data over the image of the frame inserted into the template. The content editing apparatus 1000 may display a speech bubble in the vicinity of the person in the image of the frame and may display the text data in the speech bubble.

The content editing apparatus 1000 may create the edited content based on an emotion of the person included in the scene. The content editing apparatus 1000 may determine the emotion of the person by analyzing an expression and speech of the person included in the scene. The content editing apparatus 1000 may assign a predetermined image effect to an image of a frame to be included in the template according to the emotion of the person. In addition, the content editing apparatus 1000 may determine a shape and a color of the speech bubble to be displayed in the vicinity of the person according to the emotion of the person. In addition, the content editing apparatus 1000 may determine a color, a font, and a size of text to be displayed in the speech bubble according to the emotion of the person.

Figure 10:
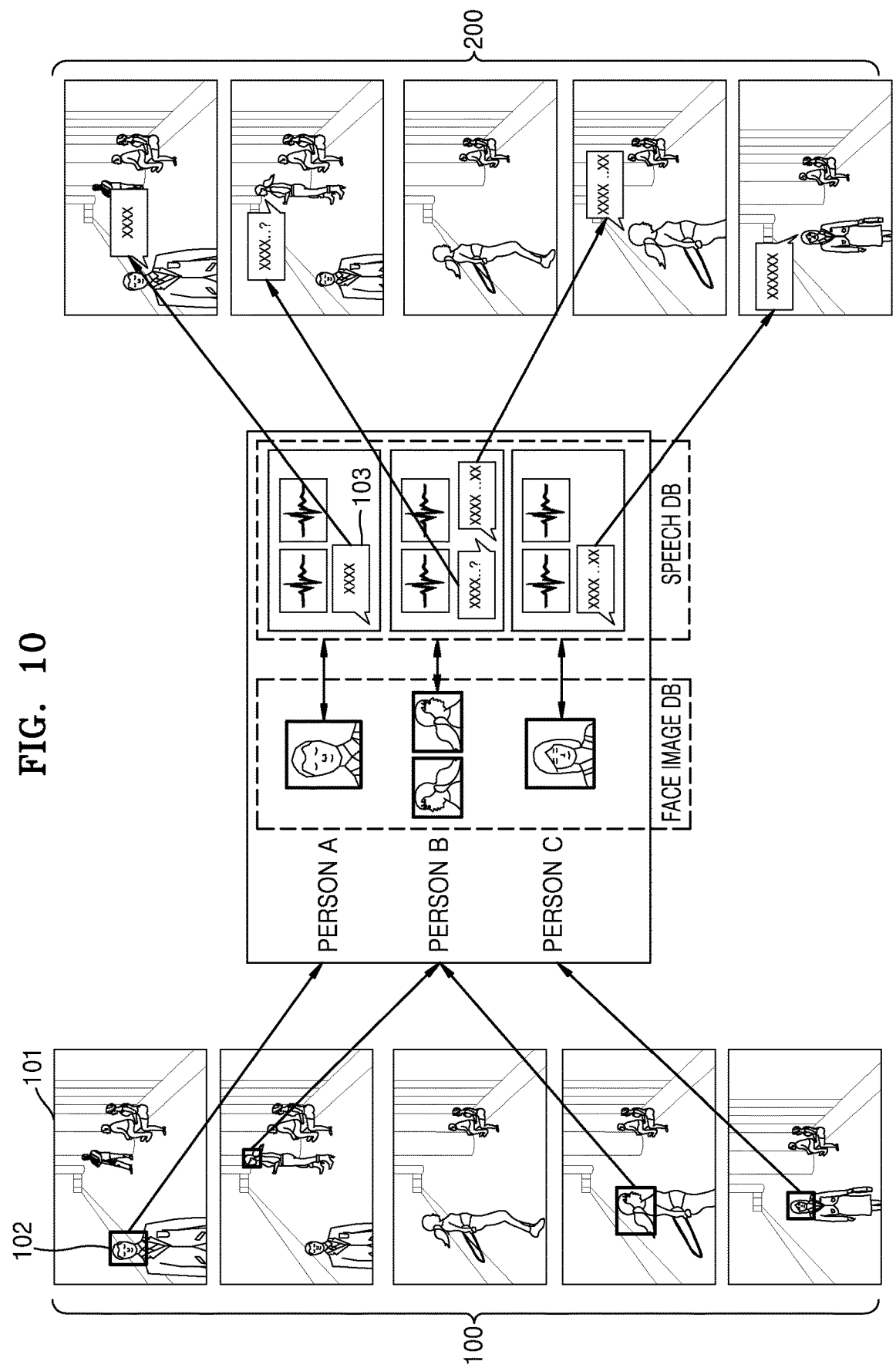
FIG. 10 is a schematic diagram illustrating an example in which editing information for content is created according to various embodiments of the present disclosure.

FIG. 10 is a schematic diagram illustrating an example in which editing information for content is created according to various embodiments of the present disclosure.

Referring to FIG. 10, images 100 are images of frames selected to create edited content, and at least one or more edited images 200 are images created by inserting text data into the images 100.

Referring to FIG. 10, the content editing apparatus 1000 may extract a face image 102 of a specific person included in an image 101 and compare the extracted image 102 with images in a face image DB to identify a category (e.g., person A) of the extracted image. In addition, the content editing apparatus 1000 may extract, from the speech DB, text data 103 mapped to a frame corresponding to the image 101 among text data mapped to the identified category. In addition, the content editing apparatus 1000 may display a speech bubble in the vicinity of the extracted face image 102 in the image 101 and may display the extracted text data 103 in the speech bubble.

Figure 11:
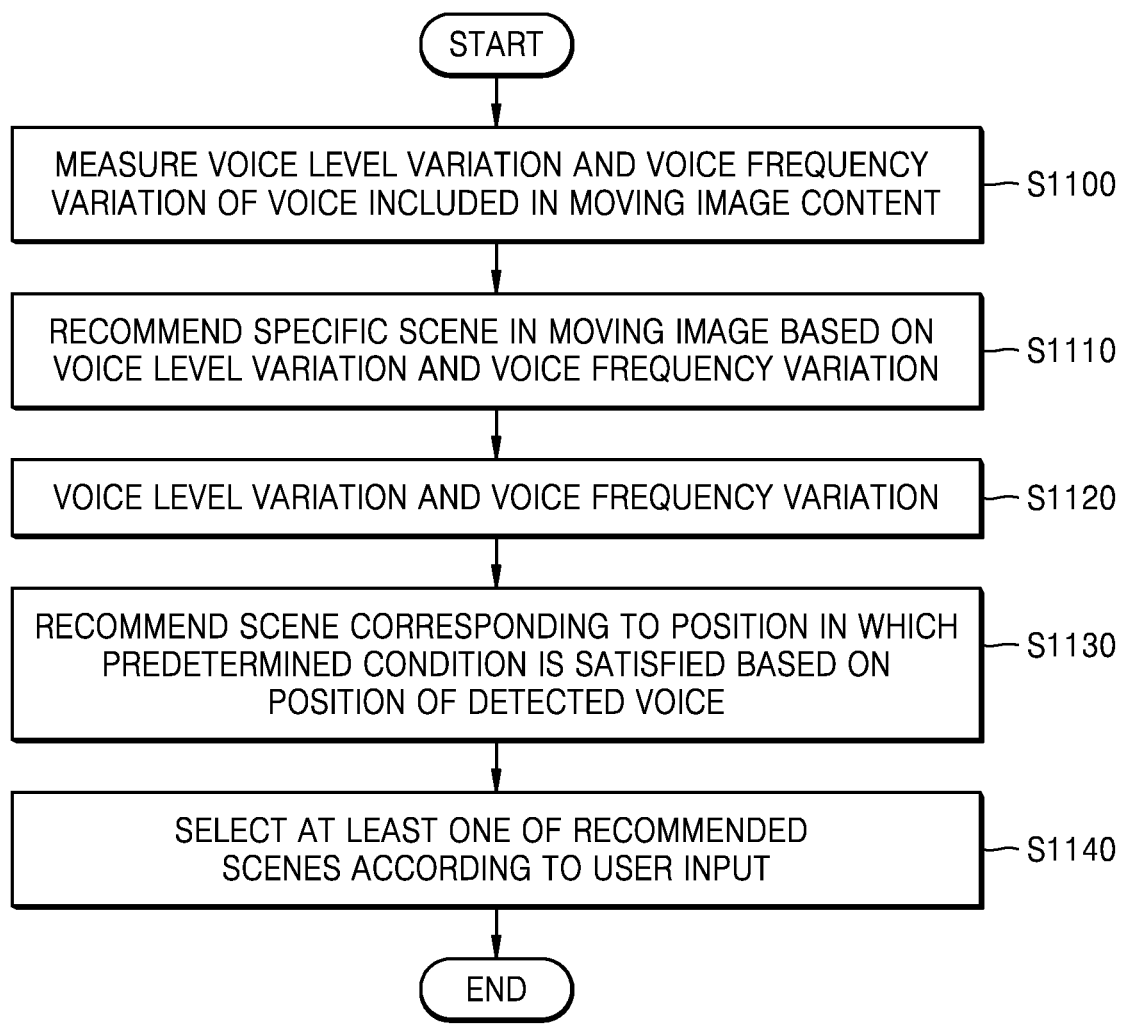
FIG. 11 is a flowchart illustrating a method of a content editing apparatus recommending and selecting a scene to be used to create edited content according to various embodiments of the present disclosure.

FIG. 11 is a flowchart illustrating a method of a content editing apparatus 1000 recommending and selecting a scene to be used to create edited content according to various embodiments of the present disclosure.

Referring to FIG. 11, in operation S1100, the content editing apparatus 1000 may measure a voice level variation and a voice frequency variation of a voice signal acquired from the moving image content. The voice level of the voice signal may be the amplitude of the voice signal.

In operation S1110, the content editing apparatus 1000 may recommend a specific scene in the moving image based on the voice level variation and the voice frequency variation. The content editing apparatus 1000 may recommend a specific scene in the moving image according to whether the voice level variation and/or the voice frequency variation are/is greater than a predetermined value(s).

The content editing apparatus 1000 may determine a portion of the voice signal in which a standard deviation of the voice level variation is greater than the predetermined value. In this case, the content editing apparatus 1000 may recommend a scene including the portion of the voice signal in which the standard deviation of the voice level variation is greater than the predetermined value.

In addition, the content editing apparatus 1000 may determine a portion of the voice signal in which a standard deviation of the voice frequency variation is greater than the predetermined value. In this case, the content editing apparatus 1000 may recommend a scene including the portion of the voice signal in which the standard deviation of the voice level variation is greater than the predetermined value.

However, embodiments of the present disclosure are not limited thereto. The content editing apparatus 1000 may recommend a scene according to various criteria based on the voice level variation and the voice frequency variation.

In operation S1120, the content editing apparatus 1000 may detect a predetermined voice in the moving image content. When the voice level variation and the voice frequency variation are less than predetermined values, the content editing apparatus 1000 may detect the predetermined voice in the moving image content. For example, the content editing apparatus 1000 may detect a portion corresponding to a laughter sound from the voice signal acquired from the moving image content. For example, the content editing apparatus 1000 may detect the portion corresponding to the laughter from the voice signal by comparing a predetermined feature value for the laughter sound with a feature value of the voice signal acquired from the moving image content. However, embodiments of the present disclosure are not limited thereto.

In operation S1130, the content editing apparatus 1000 may recommend a scene corresponding to a position in which a predetermined condition is satisfied based on a position of the detected voice. For example, the content editing apparatus 1000 may recommend a scene including the portion of the voice signal corresponding to the laughter sound and/or a scene including a predetermined portion before the portion corresponding to the laughter sound.

In operation S1140, the content editing apparatus 1000 may select at least one of the recommended scenes according to a user input. When the content editing apparatus 1000 is a user device, the content editing apparatus 1000 may display moving or still images representing the recommended scenes on a screen of the content editing apparatus 1000 and may select some of the recommended scenes based on a user selection input to the content editing apparatus 1000.

Alternatively, when the content editing apparatus 1000 is a server connected with a user device 2000, the content editing apparatus 1000 may transmit at least one of position information regarding the recommended scene in the moving image content, a moving image representing the recommended scene, and a still image representing the recommended scene to the user device 2000. In addition, the user device 2000 may display the scenes recommended from the content editing apparatus 1000 on the screen of the device 2000 and may receive a user selection input for selecting some of the recommended scenes. The user device 2000 may select some of the recommended scenes according to the user selection input and may provide identification values of the selected recommended scenes to the content editing apparatus 1000.

Figure 12:
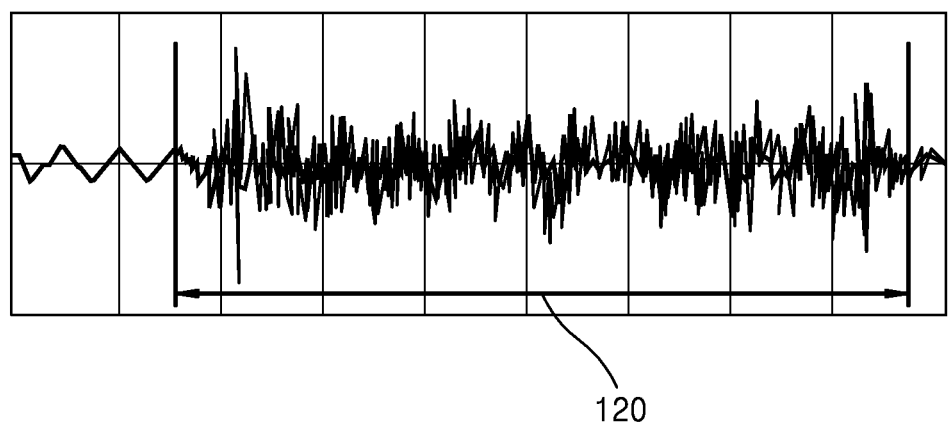
FIG. 12 is a diagram illustrating an example in which a content editing apparatus determines a recommended scene based on a voice level variation and a voice frequency variation of a voice signal acquired from moving image content according to various embodiments of the present disclosure.

FIG. 12 is a diagram illustrating an example in which a content editing apparatus 1000 determines a recommended scene based on a voice level variation and a voice frequency variation of a voice signal acquired from the moving image content according to various embodiments of the present disclosure.

Referring to FIG. 12, the content editing apparatus 1000 may select a portion 120 from the voice signal and may recommend a scene of the moving image content corresponding to the selected portion 120 based on a portion of the voice signal acquired from the moving image content in which an amplitude variation and a frequency variation of the voice signal are large.

For example, the portion of the voice signal in which the frequency variation is large may be a portion in which several sounds converge. In addition, for example, the portion of the voice signal in which the amplitude variation is large may be a portion in which a change in level of the sound is large.

Accordingly, the content editing apparatus 1000 may recommend a scene in which several sounds converge to generate a loud sound by selecting a portion of the large frequency variation and amplitude variation from the voice signal. In addition, the scene in which several sounds converge to generate a loud sound may be likely to be a highlighted scene of the moving image content.

Figure 13:
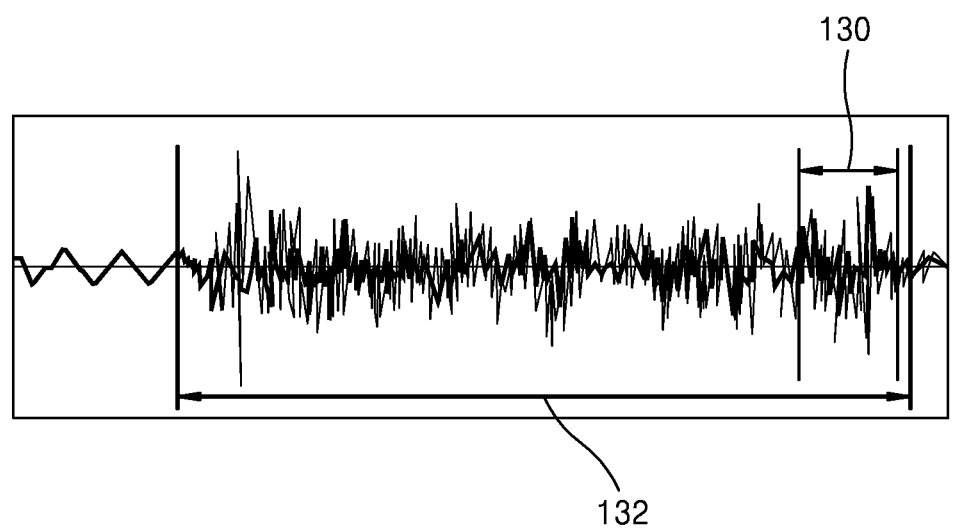
FIG. 13 is a flowchart illustrating an example in which a content editing apparatus determines a recommended scene by detecting a predetermined voice according to various embodiments of the present disclosure.

FIG. 13 is a flowchart illustrating an example in which a content editing apparatus 1000 determines a recommended scene by detecting a predetermined voice according to various embodiments of the present disclosure.

Referring to FIG. 13, the content editing apparatus 1000 may detect a portion 130 corresponding to a laughter sound from a voice signal acquired from the moving image content. The content editing apparatus 1000 may detect the portion 130 corresponding to the laughter from the voice signal by comparing a feature value for the laughter sound with a feature value of the voice signal.

In addition, the content editing apparatus 1000 may select a portion 132 ranging from the portion 130 corresponding to the laughter sound to a predetermined position in a reverse direction and may determine a scene corresponding to the selected portion 132 as the recommended scene. For example, the content editing apparatus 1000 may determine a point at which a conversation begins which is positioned in a reverse direction with respect to the portion 130 corresponding to the laughter sound and may select a portion 132 beginning from the determined point and including the portion 130 corresponding to the laughter sound.

The content editing apparatus 1000 has been described as detecting the portion corresponding to the laughter sound in FIG. 13, but is not limited thereto. For example, the content editing apparatus 1000 may detect a burst sound such as a scream, detonation, or thunder.

Figure 14:
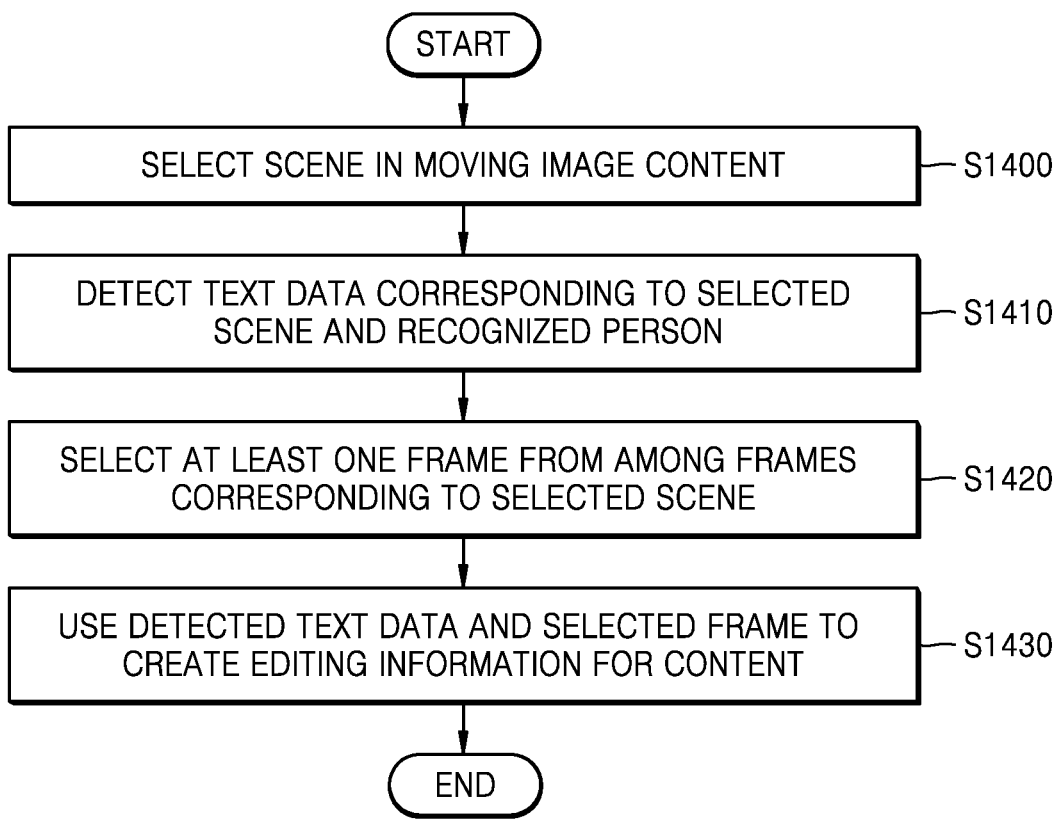
FIG. 14 is a flowchart illustrating a method of a content editing apparatus creating editing information for content by detecting text data corresponding to a person in a selected scene and selecting some frames corresponding to the selected scene according to various embodiments of the present disclosure.

FIG. 14 is a flowchart illustrating a method of a content editing apparatus 1000 creating editing information for content by detecting text data corresponding to a person in a selected scene and selecting some frames corresponding to the selected scene according to various embodiments of the present disclosure.

Referring to FIG. 14, in operation S1400, the content editing apparatus 1000 may recognize the person in the selected scene. The content editing apparatus 1000 may acquire a frame included in the selected scene from the moving image content and may recognize a person included in an image of the acquired frame. The content editing apparatus 1000 may extract a face image of the person from the image of the acquired frame. For example, the content editing apparatus 1000 may recognize a face of the person in the image of the acquired frame using a face recognition technique and may cut an image of the recognized face out of the image of the acquired frame.

In operation S1410, the content editing apparatus 1000 may detect text data corresponding to the selected scene and recognized person. The content editing apparatus 1000 may determine a person corresponding to the face image acquired in operation S1400. The content editing apparatus 1000 may determine a person of a face image identical or similar to the face image acquired in operation S1400. The content editing apparatus 1000 may determine the person corresponding to the acquired face image by comparing the face image acquired in operation S1400 with a face image included in a face image DB.

In addition, the content editing apparatus 1000 may extract text data corresponding to the selected scene and determined person. The content editing apparatus 1000 may detect text data corresponding to a playback position of a frame including the face image acquired in operation S1400 from a speech DB. The content editing apparatus 1000 may detect text data corresponding to voice data output from the moving image content at the playback position of the frame including the face image.

In operation S1420, the content editing apparatus 1000 may select at least one frame from among frames corresponding to the selected scene. The content editing apparatus 1000 may select a frame having little noise from among the frames constituting the selected scene. The content editing apparatus 1000 may determine how much noise is included in each image of the frames constituting the selected scene. The content editing apparatus 1000 may select a frame having noise less than a predetermined value based on a result of the determination.

In addition, the content editing apparatus 1000 may select at least one of the frames corresponding to the selected scene in consideration of a face direction, a line of sight, an expression, and a mouth shape of the person. For example, the content editing apparatus 1000 may select a corresponding frame when a person in the frame is facing forward, the person is looking forward, or the person's mouth is open. However, embodiments of the present disclosure are not limited thereto. The content editing apparatus 1000 may select the frame according to various criteria.

In operation S1430, the content editing apparatus 1000 may use the detected text data and the selected frame to create editing information for the content. The content editing apparatus 1000 may select a template used to create the editing information for the content. The content editing apparatus 1000 may insert all or a portion of an image of the frame selected in operation S1420 into the selected template. In addition, the content editing apparatus 1000 may insert a speech bubble including text data into the image of the selected frame.

Figure 15:
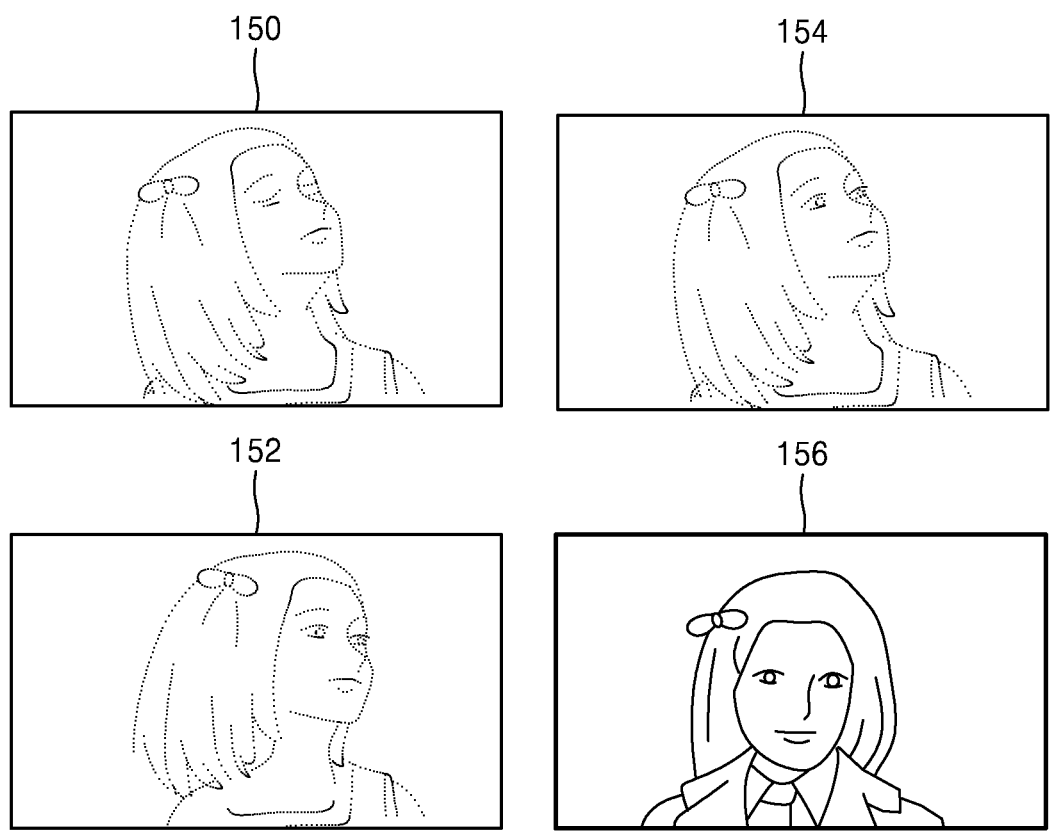
FIG. 15 is a diagram illustrating an example in which a content editing apparatus selects one of a plurality of frames included in a selected scene according to various embodiments of the present disclosure.

FIG. 15 is a diagram illustrating an example in which a content editing apparatus 1000 selects one of a plurality of frames included in a selected scene according to various embodiments of the present disclosure.

For example, referring to FIG. 15, the content editing apparatus 1000 may select a frame 156 having little noise and representing a clear image from among frames 150, 152, 154, and 156 constituting a scene. Alternatively, for example, the content editing apparatus 1000 may select the frame 156 including an image in which a person in the frame is facing forward and the person is looking forward from among frames 150, 152, 154, and 156 constituting the scene.

Figure 16:
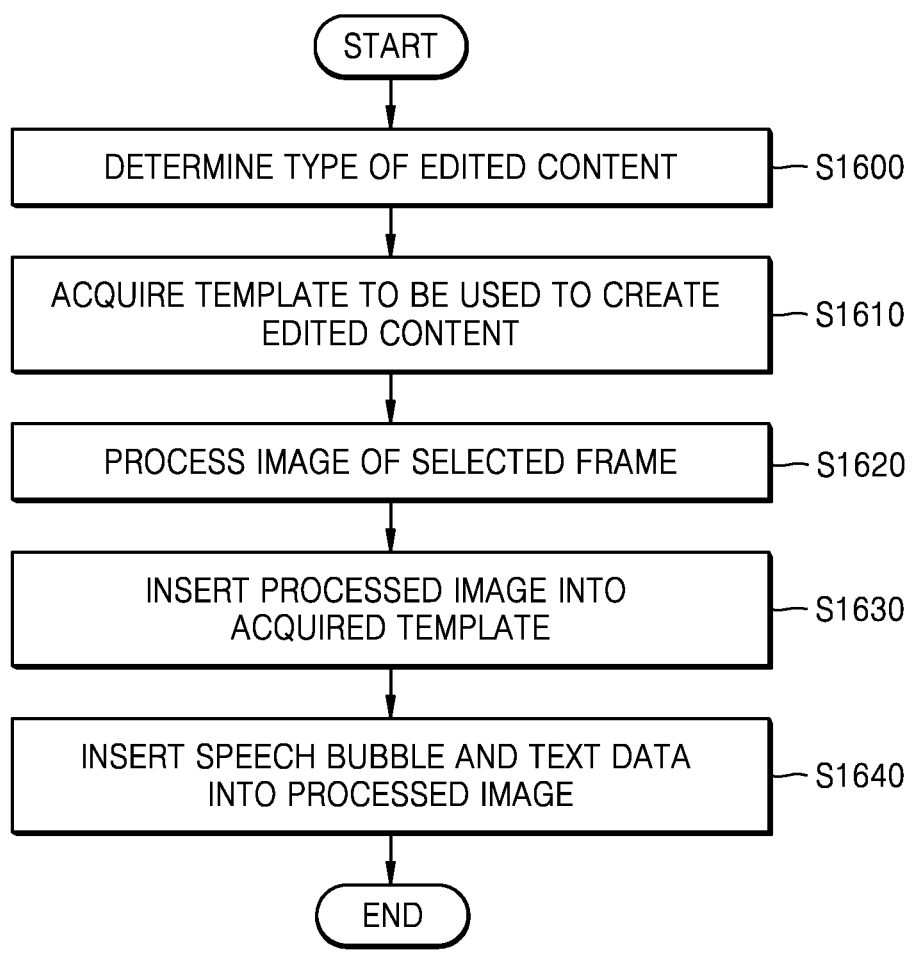
FIG. 16 is a flowchart illustrating a method of a content editing apparatus acquiring a template according to a type of edited content and creating the edited content using the acquired template according to various embodiments of the present disclosure.

FIG. 16 is a flowchart illustrating a method of a content editing apparatus 1000 acquiring a template according to a type of edited content and creating the edited content using the acquired template according to various embodiments of the present disclosure.

Referring to FIG. 16, in operation S1600, the content editing apparatus 1000 may determine a type of the edited content. The type of the edited content may include, for example, cartoon type content, album type content, and thumbnail type content. However, embodiments of the present disclosure are not limited thereto.

The content editing apparatus 1000 may determine the type of the edited content according to a user input for selecting the type of the edited content. When the content editing apparatus 1000 is a user device, the content editing apparatus 1000 may display a user interface (UI) for selecting the type of the edited content on a screen of the content editing apparatus 1000 and may select the type of the edited content based on a user selection input received through the displayed UI.

Alternatively, when the content editing apparatus 1000 is a server connected with a user device 2000, the content editing apparatus 1000 may transmit the UI for selecting the type of the edited content to the user device 2000. In addition, the user device 2000 may display the UI for selecting the type of the edited content received from the content editing apparatus 1000 on the screen of the device 2000 and receive a user selection input for selecting the type of the edited content. The user device 2000 may select the type of the edited content according to the user selection input and may provide an identification value of the selected type of the edited content to the content editing apparatus 1000.

In operation S1610, the content editing apparatus 1000 may acquire a template to be used to create the edited content. The template according to the type of the edited content may be predetermined and stored in the content editing apparatus 1000. However, embodiments of the present disclosure are not limited thereto. The content editing apparatus 1000 may receive a template corresponding to the type of the edited content from the outside. The template to be used to create the edited content may have a different layout depending on the type of the edited content. The content editing apparatus 1000 may create the layout to be used to create the edited content by combining a plurality of templates. For example, the content editing apparatus 1000 may create the layout by inserting one template into another template. In addition, the template may have an extendable format, and a user may create a desired layout by editing at least one template.

In operation S1620, the content editing apparatus 1000 may process an image of the selected frame. The content editing apparatus 1000 may change a size of the image of the frame, change a resolution of the image of the frame, or assign a predetermined image effect to the image of the frame according to the type of the edited content. For example, when the edited content is a cartoon, the content editing apparatus 1000 may assign an image to be inserted into the template to a specific effect or change the size of the image to be inserted into the template. Alternatively, for example, when the edited content is a thumbnail, the content editing apparatus 1000 may change the size and resolution of the image to be inserted into the template. Alternatively, for example, when the edited content is an album, the content editing apparatus 1000 may change the size of the image to be inserted into the template. However, embodiments of the present disclosure are not limited thereto.

Furthermore, the content editing apparatus 1000 may apply a predetermined filter effect to the image of the frame. For example, a filter may include a filter that assigns a cartoon effect to an image, a filter that makes an image clear, a filter that blurs an image, a filter that changes a color of an image, a filter that changes a chroma of an image, etc., but is not limited thereto. The content editing apparatus 1000 may add a predetermined function to the edited content by combining predetermined dynamic data to the image of the frame. However, embodiments of the present disclosure are not limited thereto.

In operation S1630, the content editing apparatus 1000 may insert the processed image into the acquired template.

The content editing apparatus 1000 may insert the processed image into an insertion position in the template corresponding to the processed image. The insertion of the image into the template may denote inserting the image into a layout formed as the template.

In operation S1640, the content editing apparatus 1000 may insert a speech bubble and text data into the processed image. The content editing apparatus 1000 may insert the speech bubble into the vicinity of a person in the processed image. The content editing apparatus 1000 may determine a region in which the speech bubble is to be displayed from among regions surrounding the person in the processed image. The content editing apparatus 1000 may determine the region in which the speech bubble is to be displayed from among regions surrounding the person in consideration of the number of characters in text representing speech of the person. The content editing apparatus 1000 may insert the speech bubble into the determined region. In addition, the content editing apparatus 1000 may insert text representing the speech of the person into the speech bubble.

The content editing apparatus 1000 has been described as inserting the image into the template and then inserting the speech bubble and text into the image in FIG. 16. However, a time at which the speech bubble and text are inserted into the image is not limited thereto. The content editing apparatus 1000 may insert the image into the template after inserting the speech bubble and/or text into the image.

The content editing apparatus 1000 has been described as inserting the image into the template in FIG. 16, but is not limited thereto. The content editing apparatus 1000 may insert a moving image representing a predetermined scene into the template. In this case, the content editing apparatus 1000 may create a moving image including frames constituting the predetermined scene and may insert the created moving image into the template. In addition, the content editing apparatus 1000 may insert text representing speech of the person into the moving image. In addition, the content editing apparatus 1000 may insert still and moving images into the template together. In addition, the content editing apparatus 1000 may combine a plurality of images and create a moving image such that the combined images are sequentially displayed like a slide show to insert the moving image into the template.

Figure 17:
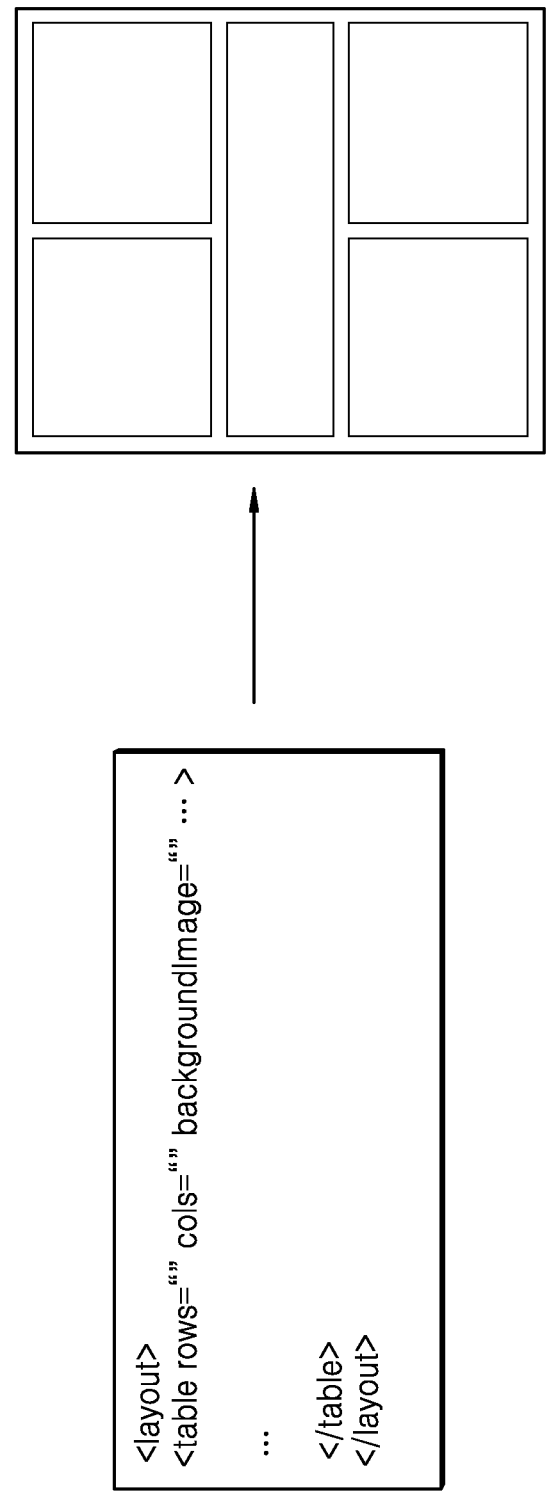
FIG. 17 is a diagram illustrating an example of a layout of a template used for a content editing apparatus to create edited content according to various embodiments of the present disclosure.

FIG. 17 is a diagram illustrating an example of a layout of a template used for a content editing apparatus 1000 to create edited content according to various embodiments of the present disclosure.

Referring to FIG. 17, a template having a specific layout may be predetermined according to the type of the edited content. At least one template may be predetermined according to the type of the edited content, and the content editing apparatus 1000 may create the edited content using a different template according to the type of the edited content.

Figure 18:
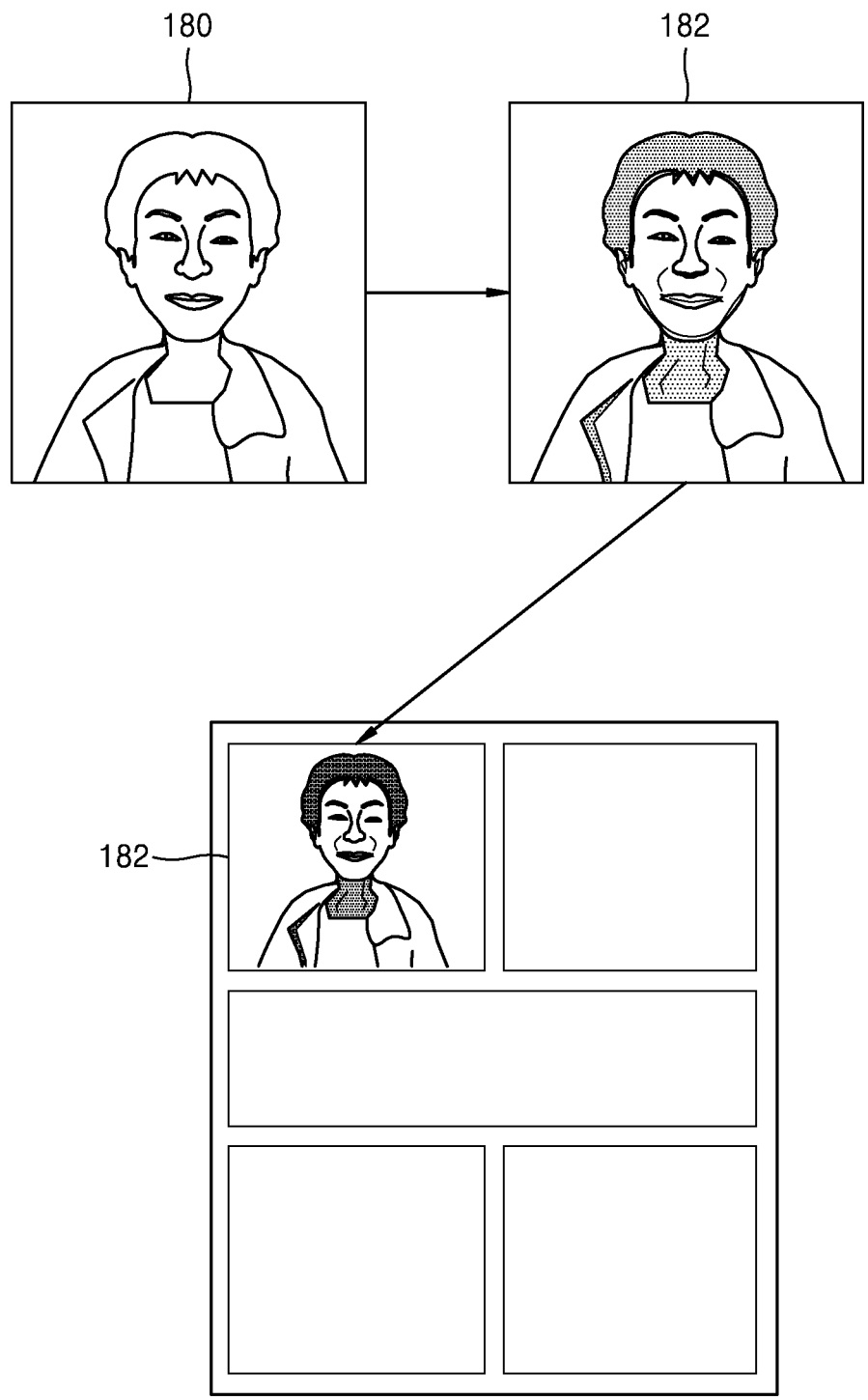
FIG. 18 is a diagram illustrating an example in which a content editing apparatus processes an image to be inserted into a template and inserts the processed image into the template according to various embodiments of the present disclosure.

FIG. 18 is a diagram illustrating an example in which a content editing apparatus 1000 processes an image to be inserted into a template and inserts the processed image into the template according to various embodiments of the present disclosure.

Referring to FIG. 18, the content editing apparatus 1000 may create an image 182 by assigning an image 180 to be inserted into a template to a predetermined image effect. In addition, the content editing apparatus 1000 may insert the image 182 to which the image effect is assigned into the template.

Figure 19:
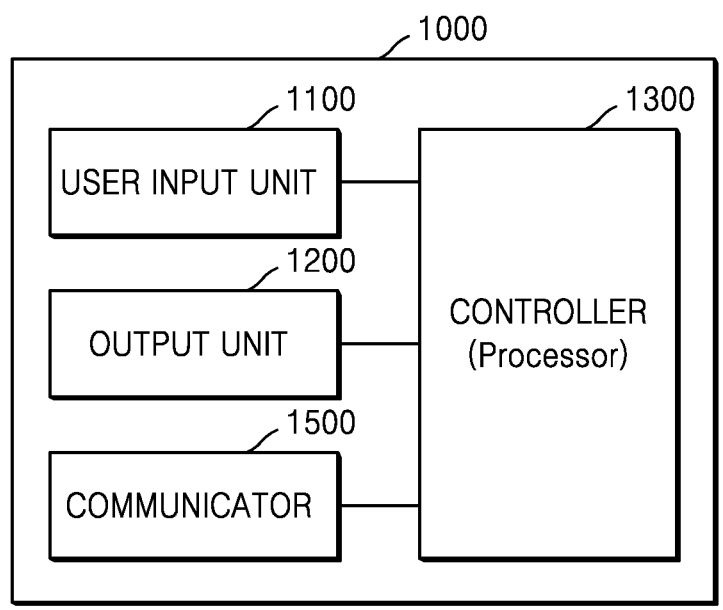
FIGS. 19 and 20 are block diagrams illustrating a content editing apparatus when the content editing apparatus is a user device according to various embodiments of the present disclosure.
Figure 20:
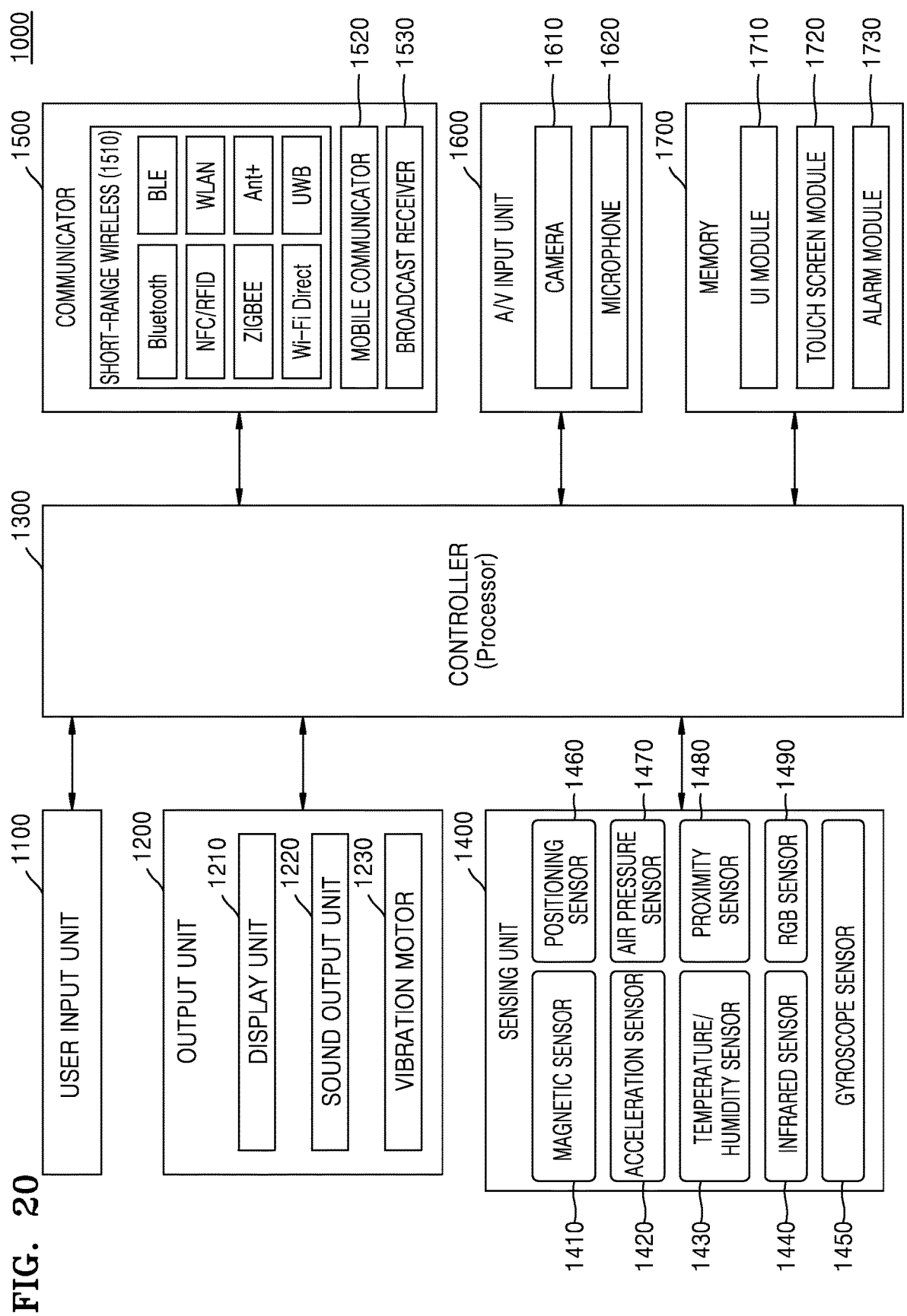

FIGS. 19 and 20 are block diagrams illustrating a content editing apparatus 1000 when the content editing apparatus 1000 is a user device according to various embodiments of the present disclosure.

Referring to FIG. 19, when the content editing apparatus 1000 is a user device, the content editing apparatus 1000 according to various embodiments of the present disclosure may include a user input unit 1100, a output unit 1200, a controller 1300, and a communicator (e.g., communication interface) 1500. However, not all of the elements shown in FIG. 19 are essential to the content editing apparatus 1000. The content editing apparatus 1000 may be implemented with more elements than those shown in FIG. 19 or may be implemented with fewer elements than those shown in FIG. 19.

For example, referring to FIG. 20, the content editing apparatus 1000 according to various embodiments of the present disclosure may further include a sensing unit 1400, an audio/video (A/V) input unit 1600, and a memory 1700 in addition to the user input unit 1100, the output unit 1200, the controller 1300, and the communicator 1500. In addition, the memory 1700 may be a DB.

The user input unit 1100 denotes a unit for a user inputting data for controlling the content editing apparatus 1000. For example, the user input unit 1100 may include, but is not limited to, a key pad, a dome switch, a touch pad (a contact capacitance type, a pressure resistance type, an infrared sensing type, a surface ultrasonic wave conduction type, an integral tension measurement type, a piezoelectric effect type, etc.), a jog wheel, a jog switch, etc.

The user input unit 1100 may receive a user input for creating edited content. For example, the user input unit 1100 may receive a user input for selecting at least one of recommended scenes, a user input for selecting at least one of frames included in the scene, or a user input for selecting a type of edited content, but is not limited thereto.

The output unit 1200 may output an audio signal, a video signal, and/or a vibration signal. The output unit 1200 may include a display unit 1210, a sound output unit 1220, and a vibration motor 1230.

The display unit 1210 displays and outputs information processed in the content editing apparatus 1000. For example, the display unit 1210 may display a UI for creating the edited content. The UI for creating the edited content may be used, for example, to select at least one of the recommended scenes, select at least one of frames included in the scene, and select a type of the edited content.

When the display unit 1210 and a touch pad form a layered structure and thus are implemented as a touch screen, the display unit 1210 may be used as an input device in addition to an output device. The display unit 1210 may include at least one of a liquid crystal display (LCD), a thin film transistor-LCD (TFT-LCD), an organic light emitting diode (OLED) display, a flexible display, a three-dimensional (3D) display, and an electrophoretic display. The content editing apparatus 1000 may include two or more display units 1210 according to the implementation of the content editing apparatus 1000. In this case, the two or more display units 1210 may be disposed to face each other using a hinge.

The sound output unit 1220 outputs audio data received from the communicator 1500 or stored in the memory 1700. The sound output unit 1220 may output an acoustic signal related to a function (e.g., a call signal reception sound, a message reception sound, or an alarm sound) performed by the content editing apparatus 1000. The sound output unit 1220 may include a speaker, a buzzer, etc.

The vibration motor 1230 may output a vibration signal. For example, the vibration motor 1230 may output a vibration signal corresponding to output of audio data or video data (e.g., a call signal reception sound, a message reception sound, etc.) In addition, the vibration motor 1230 may output the vibration signal when a touch is input to the touch screen.

The controller 1300 typically controls an overall operation of the content editing apparatus 1000. For example, the controller 1300 may control overall operations of the user input unit 1100, the output unit 1200, the sensing unit 1400, the communicator 1500, the A/V input unit 1600, and so on by executing programs stored in the memory 1700.

Furthermore, the controller 1300 may build DBs regarding an image and speech data of a person in moving image content and create edited content of the moving image content by executing functions of the content editing apparatus 1000 in FIGS. 1 to 18.

In detail, the controller 1300 may acquire the moving image content. The controller 1300 may extract the moving image content stored in the content editing apparatus 1000. The controller 1300 may receive moving image content stored in a device 2000 or an external server from the device 2000 or the external server.

The controller 1300 may map an image and speech data of a person included in the moving image content. The controller 1300 may extract face images of persons included in the moving image content from frames of the moving image content. The controller 1300 may classify the extracted face images by person.

In addition, the controller 1300 may extract voice data regarding speech of persons included in the moving image content from the moving image content and convert the extracted voice data into text data. The speech data may include at least one of the extracted voice data and the converted text data. The controller 1300 may classify the speech data by speaker.

The controller 1300 may create a face image DB regarding persons in the moving image content. The controller 1300 may acquire face images from the moving image content and extract feature values of the acquired face images. In addition, the controller 1300 may create the face image DB by grouping the face images for each person based on the extracted feature values.

In detail, the controller 1300 may acquire image data in the moving image content. The controller 1300 may acquire the image data from frames included in the moving image content. For example, the controller 1300 may acquire the image data by extracting the image data included in the frames included in the moving image content. In addition, for example, the controller 1300 may acquire the image data by using the frames included in the moving image content to capture an image displayed on a screen of the content editing apparatus 1000. The controller 1300 may acquire face images of persons from the image data. The controller 1300 may use the image data to acquire the face images of the persons of the moving image content. For example, the controller 1300 may acquire each face image by extracting image data having facial attributes from the image data. For example, the controller 1300 may acquire the face image by cutting the face image out of the image data through face recognition. However, embodiments of the present disclosure are not limited thereto. The face image may be an image representing a face of one person.

The controller 1300 may extract a feature value from the face image. The feature value for the face image is a value representing a feature of the face image and, for example, may represent a feature such as shape, color, and size of objects included in the face image. In addition, for example, the controller 1300 may extract a feature value regarding positions of and spaces between the objects included in the face image. The objects included in the face image may include, for example, a head, hair, an eye, a nose, a mouth, and an ear. In addition, the feature value may be, for example, a feature vector value. However, embodiments of the present disclosure are not limited thereto. The controller 1300 may classify face images based on the feature value. The controller 1300 may classify the face images by grouping face images having similar feature values. The controller 1300 may group face images determined to be images representing a face of the same person by comparing the feature values of the face images. The feature values and similarities between the feature values may be predetermined as criteria for the controller 1300 to determine that the face images represent the face of the same person.

The controller 1300 may create a face image DB regarding persons in the moving image content. The controller 1300 may create the face image DB by storing face images for each person. The face image DB may include not only the face images but also feature values of the face images, but is not limited thereto. The face image DB may further include information regarding playback positions of frames including the face images.

In addition, the controller 1300 may create a speech DB regarding speakers in the moving image content. The controller 1300 may collect voice data from the moving image content and extract feature values of the collected voice data. In addition, the controller 1300 may group the voice data for each speaker based on the extracted feature values. In addition, the controller 1300 may convert the voice data into text and map the text to the voice data. The controller 1300 may create the speech DB by classifying and storing the speech data including at least one of the voice data and the text data for each speaker.

The controller 1300 may acquire voice data in the moving image content. The controller 1300 may acquire the voice data from frames included in the moving image content. For example, the controller 1300 may acquire the voice data by extracting the voice data included in the frames included in the moving image content.

The controller 1300 may extract a feature value from the voice data. For example, the controller 1300 may extract a feature value for the voice data. The feature value for the voice data indicates a feature of the voice data and, for example, may include a feature such as amplitude, frequency, and tone of the voice. In addition, the feature value may be, for example, a feature vector value. However, embodiments of the present disclosure are not limited thereto.

The controller 1300 may classify the voice data based on the feature value. The controller 1300 may classify the voice data by grouping voice data having similar feature values. The controller 1300 may group the voice data determined to be voice data of the same speaker by comparing the feature values of the voice data. The feature values and similarities between the feature values may be predetermined as criteria for the controller 1300 to determine that the voice data represents the voice of the same person.

The controller 1300 may create text data by converting the voice data into text. The controller 1300 may convert the voice data into the text using a speech-to-text (STT) technique.

The controller 1300 may create a speech DB regarding speakers in the moving image content. The controller 1300 may create the speech DB by storing at least one of the voice data and the text data for each person. The speech DB may include not only the voice data and the text data but also feature values of the voice data, but is not limited thereto. In addition, the speech DB may include information regarding playback positions of frames corresponding to the voice data and the text data.

In addition, the controller 1300 may map the classified face image and the classified speech data. The controller 1300 may map an image and speech data of a specific person.

The controller 1300 may map the face image and the speech data. The controller 1300 may map face images of a specific person and speech data of a specific speaker. The person and the speaker may be the same person. Thus the face images and the speech data which are determined to belong to the same person may be mapped to each other. The controller 1300 may create a mapping table by mapping the face images and the speech data which are determined to belong to the same person.

In addition, if the person in the moving image content is a celebrity, in order to enhance a face recognition function, the controller 1300 may map images of persons provided from various service servers (not shown) to the face image DB.

In addition, the controller 1300 may determine an emotional state corresponding to the face image and the speech data of the person. The controller 1300 may determine the emotional state corresponding to the face image and the speech data of the person by analyzing the face image of the person and the speech data corresponding to the face image. For example, the controller 1300 may determine the emotion of the person by analyzing a facial expression of the person, a meaning of speech of the person, and a level and frequency of a voice of the person. In addition, the controller 1300 may map and store information indicating the determined emotion and the face image and speech data of the person.

The controller 1300 may select at least one frame from among frames included in the moving image content. The controller 1300 may select a scene to be used to create edited content from among scenes included in the moving image content. The controller 1300 may select at least one frame from among frames corresponding to the selected scene according to a predetermined criterion.

The controller 1300 may measure a voice level variation and a voice frequency variation of a voice signal acquired from the moving image content. The voice level of the voice signal may be the amplitude of the voice signal.

The controller 1300 may recommend a specific scene in the moving image based on the voice level variation and the voice frequency variation. The unit 1300 may recommend a specific scene in the moving image according to whether the voice level variation and/or the voice frequency variation are/is greater than a predetermined value(s).

The controller 1300 may determine a portion of the voice signal in which a standard deviation of the voice level variation is greater than the predetermined value. In this case, the controller 1300 may recommend a scene including the portion of the voice signal in which the standard deviation of the voice level variation is greater than the predetermined value.

The controller 1300 may determine a portion of the voice signal in which a standard deviation of the voice frequency variation is greater than the predetermined value. In this case, the controller 1300 may recommend a scene including the portion of the voice signal in which the standard deviation of the voice frequency variation is greater than the predetermined value. However, embodiments of the present disclosure are not limited thereto. The controller 1300 may recommend a scene according to various criteria based on the voice level variation and the voice frequency variation.

The controller 1300 may detect a predetermined voice in the moving image content. When the voice level variation and the voice frequency variation are less than predetermined values, the controller 1300 may detect the predetermined voice in the moving image content. For example, the controller 1300 may detect a portion corresponding to a laughter sound from the voice signal acquired from the moving image content. The controller 1300, for example, may detect the portion corresponding to the laughter from the voice signal by comparing a predetermined feature value for the laughter sound with a feature value of the voice signal acquired from the moving image content. However, embodiments of the present disclosure are not limited thereto.

The controller 1300 may recommend a scene corresponding to a position in which a predetermined condition is satisfied based on a position of the detected voice. For example, the controller 1300 may recommend a scene including the portion of the voice signal corresponding to the laughter sound and/or a scene including a predetermined portion before the portion corresponding to the laughter sound.

The controller 1300 may select at least one of the recommended specific scenes according to a user input. The controller 1300 may display moving or still images representing the recommended scenes on a screen of the content editing apparatus 1000 and may select some of the recommended scenes based on a user selection input to the content editing apparatus 1000.

The controller 1300 may recognize a person in the selected scene. The controller 1300 may acquire a frame included in the selected scene from the moving image content and may recognize a person included in an image of the acquired frame. The controller 1300 may extract a face image of the person from the image of the acquired frame. For example, the controller 1300 may recognize a face of the person in the image of the acquired frame using a face recognition technique and may cut an image of the recognized face out of the image of the acquired frame.

The controller 1300 may detect text data corresponding to the selected scene and the recognized person. The controller 1300 may determine a person corresponding to the acquired face image. The controller 1300 may determine a person having a face image identical or similar to the acquired face image. The controller 1300 may determine the person corresponding to the acquired face image by comparing the acquired face image with a face image included in a face image DB.

The controller 1300 may extract text data corresponding to the selected scene and the determined person. The controller 1300 may detect text data corresponding to a playback position of a frame including the acquired face image from a speech DB. The controller 1300 may detect text data corresponding to voice data output from the moving image content at the playback position of the frame including the face image.

The controller 1300 may select at least one frame from among frames corresponding to the selected scene. The controller 1300 may select a frame having little noise from among the frames constituting the selected scene. The controller 1300 may determine how much noise is included in each image of the frames constituting the selected scene.

The controller 1300 may select a frame having noise less than a predetermined value based on a result of the determination.

In addition, the controller 1300 may select at least one of the frames corresponding to the selected scene in consideration of a face direction, a line of sight, an expression, and a mouth shape of the person. For example, the controller 1300 may select a corresponding frame when a person in the frame is facing forward, the person is looking forward, or the person's mouth is open. However, embodiments of the present disclosure are not limited thereto. The controller 1300 may select the frame according to various criteria.

The controller 1300 may use the selected frame to create edited content of the moving image content. The controller 1300 may acquire a template of the edited content and may create the edited content by inserting an image of the selected frame into the template. In addition, the controller 1300 may extract speech data of the person in the image of the selected frame from the DB based on the face image of the person in the image of the selected frame. In addition, the controller 1300 may use the extracted speech data to insert text representing what is uttered by the person in the image of the selected frame into the vicinity of the person.

The controller 1300 may determine a type of the edited content. The type of the edited content may include, for example, cartoon type content, album type content, and thumbnail type content. However, embodiments of the present disclosure are not limited thereto.

The controller 1300 may determine the type of the edited content according to a user input for selecting the type of the edited content. The controller 1300 may display a UI for selecting the type of the edited content on a screen and may select the type of the edited content based on a user selection input received through the displayed UI.

The controller 1300 may acquire a template to be used to create the edited content. The template according to the type of the edited content may be predetermined and stored in the content editing apparatus 1000. However, embodiments of the present disclosure are not limited thereto. The controller 1300 may receive a template corresponding to the type of the edited content from the outside. The template to be used to create the edited content may have a different layout depending on the type of the edited content.

The controller 1300 may process an image of the selected frame. The controller 1300 may change a size of the image of the frame, change a resolution of the image of the frame, or assign a predetermined image effect to the image of the frame according to the type of the edited content. For example, when the edited content is a cartoon, the controller 1300 may assign an image to be inserted into the template to a specific effect or change the size of the image to be inserted into the template. Alternatively, for example, when the edited content is a thumbnail, the controller 1300 may change the size and resolution of the image to be inserted into the template. Alternatively, for example, when the edited content is an album, the controller 1300 may change the size of the image to be inserted into the template. However, embodiments of the present disclosure are not limited thereto.

Furthermore, the controller 1300 may apply a predetermined filter effect to the image of the frame. The controller 1300 may add a predetermined function to the edited content by combining predetermined dynamic data to the image of the frame. However, embodiments of the present disclosure are not limited thereto.

The controller 1300 may insert the processed image into the acquired template. The controller 1300 may insert the processed image into an insertion position in the template corresponding to the processed image.

The controller 1300 may insert a speech bubble and text data into the processed image. The controller 1300 may insert the speech bubble into the vicinity of a person in the processed image. The controller 1300 may determine a region in which the speech bubble is to be displayed from among regions surrounding the person in the processed image. The controller 1300 may determine the region in which the speech bubble is to be displayed from among regions surrounding the person in consideration of the number of characters in text representing speech of the person. The controller 1300 may insert the speech bubble into the determined region. In addition, the controller 1300 may insert text representing the speech of the person into the speech bubble.

The sensing unit 1400 may sense a state of the content editing apparatus 1000 or a state surrounding the content editing apparatus 1000 and may deliver the sensed information to the controller 1300.

The sensing unit 1400 may include, but is not limited to, at least one of a magnetic sensor 1410, an acceleration sensor 1420, a temperature/humidity sensor 1430, an infrared sensor 1440, a gyroscope sensor 1450, a positioning sensor 1460 (e.g., a GPS sensor), an air pressure sensor 1470, a proximity sensor 1480, and a red, green, blue (RGB) sensor (illumination sensor) 1490. A function for each sensor may be directly inferred from its name by those skilled in the art, and thus its detailed description will be omitted.

The communicator 1500 may include one or more elements for communicating between the content editing apparatus 1000 and the outside. For example, the communicator 1500 may include a short-range wireless communicator 1510, a mobile communicator 1520, and a broadcast receiver 1530.

The short-range wireless communicator 1510 may include, but is not limited to, a Bluetooth communicator, a Bluetooth low energy (BLE) communicator, a near field communicator, a wireless local area network (WLAN) communicator, a ZigBee communicator, an infrared data association (IrDA) communicator, a Wi-Fi direct (WFD) communicator, an ultra wideband (UWB) communicator, and an ANT+ communicator.

The mobile communicator 1520 transmits and receives a radio signal to and from at least one of a base station, an external terminal, and a server on a mobile communication network. The radio signal may include a voice call signal, a video call signal, or various forms of data according to transmission and/or reception of a text and/or multimedia message.

The broadcast receiver 1530 receives a broadcast signal and/or broadcast-related information from the outside over a broadcast channel. The broadcast channel may include a satellite channel and a terrestrial channel Depending on the implementation, the content editing apparatus 1000 may not include the broadcast receiver 1530.

In addition, the communicator 1500 may transmit and receive information used to create the edited content of the moving image content to and from external equipment or an external server.

The A/V input unit 1600 is configured to input an audio or video signal and may include a camera 1610 and a microphone 1620. The camera 1610 may obtain a picture frame of a still picture or video through an image sensor in a video call mode or image capturing mode. An image captured through the image sensor may be processed through the controller 1300 or a separate image processing unit (not shown).

The picture frame processed by the camera 1610 may be stored in the memory 1700 or transmitted to the outside via the communicator 1500. Two or more cameras 1610 may be provided according to a configuration aspect of the terminal.

The microphone 1620 receives and processes an external acoustic signal into electrical voice data. For example, the microphone 1620 may receive an acoustic signal from an external device or a speaker. The microphone 1620 may use various noise removal algorithms for removing noise generated while receiving the external acoustic signal.

The memory 1700 may store a program for processing and controlling the controller 1300 and may also store data that is input to the content editing apparatus 1000 and output from the content editing apparatus 1000.

The memory 1700 may include a flash memory type, hard disk type, multimedia card micro type, or card type memory (e.g., a secure digital (SD) or extreme digital (xD) memory), or at least one type of storage medium of a random access memory (RAM), a static RAM (SRAM), a read-only memory (ROM), an electrically erasable programmable ROM (EEPROM), a PROM, a magnetic memory, a magnetic disk, and an optical disc.

Programs stored in the memory 1700 may be classified into a plurality of modules according to the functions of the programs and, for example, may be classified into a UI module 1710, a touch screen module 1720, an alarm module 1730, and so on.

The UI module 1710 may provide a specialized UI, graphical UI (GUI), or the like, which is in cooperation with the content editing apparatus 1000 for each application. The touch screen module 1720 may sense a touch gesture of a user on a touch screen and deliver information regarding the touch gesture to the controller 1300. The touch screen module 1720 according to various embodiments of the present disclosure may recognize and analyze a touch code. The touch screen module 1720 may be configured as separate hardware including a controller.

In order to sense a touch or a proximity touch on the touch screen, various sensors may be provided inside or near the touch screen. An example of the sensor for sensing the touch on the touch screen is a tactile sensor. The tactile sensor denotes a sensor that senses a touch by a specific object to a degree that a human can feel or more. The tactile sensor may sense various information such as a roughness of a touched surface, a stiffness of a touched object, a temperature of a touched point, etc.

Moreover, an example of the sensor for sensing the touch on the touch screen is a proximity sensor.

The proximity sensor denotes a sensor that uses an electromagnetic force or infrared light to detect an object approaching a detection surface or an object near the detection surface without any mechanical contact. Examples of the proximity sensor include a transmissive photoelectric sensor, a direct reflective photoelectric sensor, a mirror reflective photoelectric sensor, a high-frequency oscillation proximity sensor, a capacitive proximity sensor, a magnetic proximity sensor, and an infrared proximity sensor. Examples of a user's touch gesture may include a tap, a touch and hold, a drag, panning, a flick, a drag and drop, and a swipe.

The alarm module 1730 may generate a signal for alarming of occurrence of an event in the content editing apparatus 1000. Examples of the event occurring in the content editing apparatus 1000 may include reception of a call signal, reception of a message, input of a key signal, and notice of schedule. The alarm module 1730 may output an alarm signal in the form of a video signal through the display unit 1210, output an alarm signal in the form of an audio signal through the sound output unit 1220, and output an alarm signal in the form of a vibration signal through the vibration motor 1230.

Figure 21:
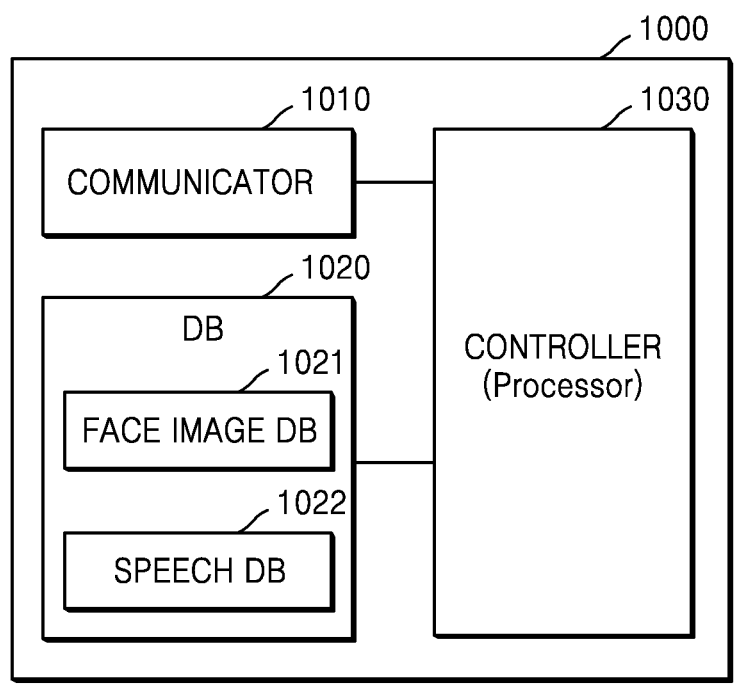
FIG. 21 is a block diagram illustrating a content editing apparatus when the content editing apparatus is a server according to various embodiments of the present disclosure.

FIG. 21 is a block diagram illustrating a content editing apparatus 1000 when the content editing apparatus 1000 is a server according to various embodiments of the present disclosure.

Referring to FIG. 21, the content editing apparatus 1000 may include a communicator (e.g., communication interface) 1010, a DB 1020, and a controller 1030, and the DB 1020 may include a face image DB 1021 and a speech DB 1022.

The communicator 1010 may include one or more elements for communicating between the content editing apparatus 1000 and the outside. For example, the communicator 1010 may include a short-range wireless communicator, a mobile communicator, and a broadcast receiver, but is not limited thereto. The short-range wireless communicator may include, but is not limited to, a Bluetooth communicator, a BLE communicator, a near field communicator, a WLAN communicator, a ZigBee communicator, an IrDA communicator, a WFD communicator, a UWB communicator, and an ANT+ communicator. The mobile communicator transmits and receives a radio signal to and from at least one of a base station, an external terminal, and a server on a mobile communication network. The radio signal may include a voice call signal, a video call signal, or various forms of data according to transmission and/or reception of a text and/or multimedia message. The broadcast receiver receives a broadcast signal and/or broadcast-related information from the outside over a broadcast channel. The broadcast channel may include a satellite channel and a terrestrial channel.

In addition, the communicator 1500 may transmit and receive information used to create the edited content of the moving image content to and from external equipment or an external server.

The DB 1020 may store a face image and speech data of a person in the moving image content.

The face image DB 1021 may store face images in the moving image content for each person. The face image DB 1021 may store not only the face images but also feature values of the face images, but is not limited thereto. In addition, the face image DB 1021 may include information regarding playback positions of frames including the face images.

The speech DB 1022 may store speech data of the person in the moving image content. The speech data may include at least one of the voice data and the text data. The speech DB 1022 may include not only the voice data and the text data but also feature values of the voice data, but is not limited thereto. In addition, the speech DB 1022 may include information regarding playback positions of frames corresponding to the voice data and the text data.

The DB 1020 may store a mapping value of the classified face image and the classified speech data. An image and speech data of a specific person may be mapped to each other, and the DB 1020 may store a mapping value indicating which image is mapped to which speech data.

The controller 1030 typically controls an overall operation of the content editing apparatus 1000. For example, the controller 1030 may control overall operations of the communicator 1010 and the DB 1020 by executing programs stored in the DB 1020.

Furthermore, the controller 1030 may build DBs regarding an image and speech data of a person in moving image content and create edited content of the moving image content by executing functions of the content editing apparatus 1000 in FIGS. 1 to 18.

In detail, the controller 1030 may acquire the moving image content. The controller 1030 may extract the moving image content stored in the content editing apparatus 1000. The controller 1030 may receive moving image content stored in a device 2000 or an external server from the device 2000 or the external server.

The controller 1030 may map an image and speech data of a person included in the moving image content. The controller 1030 may extract face images of persons included in the moving image content from frames of the moving image content. The controller 1030 may classify the extracted face images by person.

In addition, the controller 1030 may extract voice data regarding speech of persons included in the moving image content from the moving image content and convert the extracted voice data into text data. The speech data may include at least one of the extracted voice data and the converted text data. The controller 1030 may classify the speech data by speaker.

The controller 1030 may create a face image DB regarding persons in the moving image content. The controller 1030 may acquire face images from the moving image content and extract feature values of the acquired face images. In addition, the controller 1030 may create the face image DB by grouping the face images for each person based on the extracted feature values.

In detail, the controller 1030 may acquire image data in the moving image content. The controller 1030 may acquire the image data from frames included in the moving image content. For example, the controller 1030 may acquire the image data by extracting the image data included in the frames included in the moving image content. The controller 1030 may acquire face images of persons from the image data. The controller 1030 may use the image data to acquire the face images of the persons of the moving image content. For example, the controller 1030 may acquire each face image by extracting image data having facial attributes from the image data. For example, the controller 1030 may acquire the face image by cutting the face image out of the image data through face recognition. However, embodiments of the present disclosure are not limited thereto. The face image may be an image representing a face of one person.

The controller 1030 may extract a feature value from the face image. The feature value for the face image is a value representing a feature of the face image and, for example, may represent features such as shapes, colors, and sizes of objects included in the face image. In addition, for example, the controller 1030 may extract a feature value regarding positions of and spaces between the objects included in the face image. The objects included in the face image may include, for example, a head, hair, an eye, a nose, a mouth, and an ear. In addition, the feature value may be, for example, a feature vector value. However, embodiments of the present disclosure are not limited thereto.

The controller 1030 may classify face images based on the feature value. The controller 1030 may classify the face images by grouping face images having similar feature values. The controller 1030 may group face images determined to be images representing a face of the same person by comparing the feature values of the face images. The feature values and similarities between the feature values may be predetermined as criteria for the controller 1030 to determine that the face images represent the face of the same person.

The controller 1030 may create a face image DB regarding persons in the moving image content. The controller 1030 may create the face image DB by storing face images for each person. The face image DB may include not only the face images but also feature values of the face images, but is not limited thereto. The face image DB may further include information regarding playback positions of frames including the face images.

In addition, the controller 1030 may create a speech DB regarding speakers in the moving image content. The controller 1030 may collect voice data from the moving image content and extract feature values of the collected voice data. In addition, the controller 1030 may group the voice data for each speaker based on the extracted feature values. In addition, the controller 1030 may convert the voice data into text and map the text to the voice data. The controller 1030 may create the speech DB by classifying and storing the speech data including at least one of the voice data and the text data for each speaker.

The controller 1030 may acquire voice data in the moving image content. The controller 1030 may acquire the voice data from frames included in the moving image content. For example, the controller 1030 may acquire the voice data by extracting the voice data included in the frames included in the moving image content.

The controller 1030 may extract a feature value from the voice data. For example, the controller 1030 may extract a feature value for the voice data. The feature value for the voice data indicates a feature of the voice data and, for example, may include a feature such as amplitude, frequency, and tone of the voice. In addition, the feature value may be, for example, a feature vector value. However, embodiments of the present disclosure are not limited thereto.

The controller 1030 may classify the voice data based on the feature value. The controller 1030 may classify the voice data by grouping voice data having similar feature values. The controller 1030 may group the voice data determined to be voice data of the same speaker by comparing the feature values of the voice data. The feature values and similarities between the feature values may be predetermined as criteria for the controller 1030 to determine that the voice data represents the voice of the same person.

The controller 1030 may create text data by converting the voice data into text. The controller 1030 may convert the voice data into the text using an STT technique.

The controller 1030 may create a speech DB regarding speakers in the moving image content. The controller 1030 may create the speech DB by storing at least one of the voice data and the text data for each person. The speech DB may include not only the voice data and the text data but also feature values of the voice data, but is not limited thereto. In addition, the speech DB may include information regarding playback positions of frames corresponding to the voice data and the text data.

In addition, the controller 1030 may map the classified face image and the classified speech data. The controller 1030 may map an image and speech data of a specific person.

The controller 1030 may map the face image and the speech data. The controller 1030 may map face images of a specific person and speech data of a specific speaker. The person and the speaker may be the same person. Thus the face images and the speech data which are determined to belong to the same person may be mapped to each other. The controller 1030 may create a mapping table by mapping the face images and the speech data which are determined to belong to the same person.

In addition, if the person in the moving image content is a celebrity, in order to enhance a face recognition function, the controller 1030 may map images of persons provided from various service servers (not shown) to the face image DB.

The controller 1030 may select at least one frame from among frames included in the moving image content. The controller 1030 may select a scene to be used to create edited content from among scenes included in the moving image content. The controller 1030 may select at least one frame from among frames corresponding to the selected scene according to a predetermined criterion.

The controller 1030 may measure a voice level variation and a voice frequency variation of a voice signal acquired from the moving image content. The voice level of the voice signal may be the amplitude of the voice signal.

The controller 1030 may recommend a specific scene in the moving image based on the voice level variation and the voice frequency variation. The unit 1030 may recommend a specific scene in the moving image according to whether the voice level variation and/or the voice frequency variation are/is greater than a predetermined value(s).

The controller 1030 may determine a portion of the voice signal in which a standard deviation of the voice level variation is greater than the predetermined value. In this case, the controller 1030 may recommend a scene including the portion of the voice signal in which the standard deviation of the voice level variation is greater than the predetermined value.

The controller 1030 may determine a portion of the voice signal in which a standard deviation of the voice frequency variation is greater than the predetermined value. In this case, the controller 1030 may recommend a scene including the portion of the voice signal in which the standard deviation of the voice frequency variation is greater than the predetermined value. However, embodiments of the present disclosure are not limited thereto. The controller 1030 may recommend a scene according to various criteria based on the voice level variation and the voice frequency variation.

The controller 1030 may detect a predetermined voice in the moving image content. When the voice level variation and the voice frequency variation are less than predetermined values, the controller 1030 may detect the predetermined voice in the moving image content. For example, the controller 1030 may detect a portion corresponding to a laughter sound from the voice signal acquired from the moving image content. The controller 1030, for example, may detect the portion corresponding to the laughter from the voice signal by comparing a predetermined feature value for the laughter sound with a feature value of the voice signal acquired from the moving image content. However, embodiments of the present disclosure are not limited thereto.

The controller 1030 may recommend a scene corresponding to a position in which a predetermined condition is satisfied based on a position of the detected voice. For example, the controller 1030 may recommend a scene including the portion of the voice signal corresponding to the laughter sound and/or a scene including a predetermined portion before the portion corresponding to the laughter sound.

The controller 1030 may select at least one of the recommended specific scenes according to a user input. The controller 1030 may transmit at least one of position information regarding the recommended scene in the moving image content, a moving image representing the recommended scene, and a still image representing the recommended scene to the user device 2000. In addition, the user device 2000 may display the scenes recommended from the content editing apparatus 1000 on the screen of the device 2000 and may receive a user selection input for selecting some of the recommended scenes. The user device 2000 may select some of the recommended scenes according to the user selection input and may provide identification values of the selected recommended scenes to the content editing apparatus 1000.

The controller 1030 may recognize a person in the selected scene. The controller 1030 may acquire a frame included in the selected scene from the moving image content and may recognize a person included in an image of the acquired frame. The controller 1030 may extract a face image of the person from the image of the acquired frame. For example, the controller 1030 may recognize a face of the person in the image of the acquired frame using a face recognition technique and may cut an image of the recognized face out of the image of the acquired frame.

The controller 1030 may detect text data corresponding to the selected scene and the recognized person. The controller 1030 may determine a person corresponding to the acquired face image. The controller 1030 may determine a person having a face image identical or similar to the acquired face image. The controller 1030 may determine the person corresponding to the acquired face image by comparing the acquired face image with a face image included in a face image DB.

The controller 1030 may extract text data corresponding to the selected scene and the determined person. The controller 1030 may detect text data corresponding to a playback position of a frame including the acquired face image from a speech DB. The controller 1030 may detect text data corresponding to voice data output from the moving image content at the playback position of the frame including the face image.

The controller 1030 may select at least one frame from among frames corresponding to the selected scene. The controller 1030 may select a frame having little noise from among the frames constituting the selected scene. The controller 1030 may determine how much noise is included in each image of the frames constituting the selected scene. The controller 1030 may select a frame having noise less than a predetermined value based on a result of the determination.

In addition, the controller 1030 may select at least one of the frames corresponding to the selected scene in consideration of a face direction, a line of sight, an expression, and a mouth shape of the person. For example, the controller 1030 may select a corresponding frame when a person in the frame is facing forward, the person is looking forward, or the person's mouth is open. However, embodiments of the present disclosure are not limited thereto. The controller 1030 may select the frame according to various criteria.

The controller 1030 may use the selected frame to create edited content of the moving image content. The controller 1030 may acquire a template of the edited content and may create the edited content by inserting an image of the selected frame into the template. In addition, the controller 1030 may extract speech data of the person in the image of the selected frame from the DB based on the face image of the person in the image of the selected frame. In addition, the controller 1030 may use the extracted speech data to insert text representing what is uttered by the person in the image of the selected frame into the vicinity of the person.

The controller 1030 may determine a type of the edited content. The type of the edited content may include, for example, cartoon type content, album type content, and thumbnail type content. However, embodiments of the present disclosure are not limited thereto.

The controller 1030 may determine the type of the edited content according to a user input for selecting the type of the edited content. The controller 1030 may transmit a UI for selecting the type of the edited content to the user device 2000. In addition, the user device 2000 may display the UI for selecting the type of the edited content received from the content editing apparatus 1000 on the screen of the device 2000 and receive a user selection input for selecting the type of the edited content. The user device 2000 may select the type of the edited content according to the user selection input and may provide an identification value of the selected type of the edited content to the content editing apparatus 1000.

The controller 1030 may acquire a template to be used to create the edited content. The template according to the type of the edited content may be predetermined and stored in the content editing apparatus 1000. However, embodiments of the present disclosure are not limited thereto. The controller 1030 may receive a template corresponding to the type of the edited content from the outside. The template to be used to create the edited content may have a different layout depending on the type of the edited content.

The controller 1030 may process an image of the selected frame. The controller 1030 may change a size of the image of the frame, change a resolution of the image of the frame, or assign a predetermined image effect to the image of the frame according to the type of the edited content. For example, when the edited content is a cartoon, the controller 1030 may assign an image to be inserted into the template to a specific effect or change the size of the image to be inserted into the template. Alternatively, for example, when the edited content is a thumbnail, the controller 1030 may change the size and resolution of the image to be inserted into the template. Alternatively, for example, when the edited content is an album, the controller 1030 may change the size of the image to be inserted into the template. However, embodiments of the present disclosure are not limited thereto.

Furthermore, the controller 1030 may apply a predetermined filter effect to the image of the frame. The controller 1030 may add a predetermined function to the edited content by combining predetermined dynamic data to the image of the frame. However, embodiments of the present disclosure are not limited thereto.

The controller 1030 may insert the processed image into the acquired template. The controller 1030 may insert the processed image into an insertion position in the template corresponding to the processed image.

The controller 1030 may insert a speech bubble and text data into the processed image. The controller 1030 may insert the speech bubble into the vicinity of a person in the processed image. The controller 1030 may determine a region in which the speech bubble is to be displayed from among regions surrounding the person in the processed image. The controller 1030 may determine the region in which the speech bubble is to be displayed from among regions surrounding the person in consideration of the number of characters in text representing speech of the person. The controller 1030 may insert the speech bubble into the determined region. In addition, the controller 1030 may insert text representing the speech of the person into the speech bubble.

Some embodiments of the present disclosure may be implemented as a non-transitory computer-readable recording medium including instructions executable by a computer or processor such as a program module executed by the computer. The non-transitory computer-readable medium may be any usable medium accessible by a computer and may include volatile and non-volatile media and discrete and integrated media. Also, the non-transitory computer-readable medium may include both a computer storage medium and a communication medium. The computer storage medium includes the volatile and non-volatile media and the discrete and integrated media, which are implemented in any method or technique for storing information such as a computer readable instruction, data structure, program module, or other data. The communication module typically includes the computer readable instruction, data structure, program module, or other data and transmission mechanism of a modulated data signal such as a carrier and further includes any information transmission medium.

In the present disclosure, the term "unit" may denote a hardware component such as a processor or circuit or a software component executed by the hardware component such as a processor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device for creating a cartoon strip image, the method comprising:
    acquiring moving image content via a camera of the electronic device;
    storing the moving image content in a memory of the electronic device;
    identifying a plurality of still images from the moving image content, based at least on analyzing features related to eyes of a subject appearing in the moving image content, the analyzing comprising determining whether the eyes of the subject are open;
    generating a cartoon strip using the identified still images;
    identifying a speech balloon and text to be included in the speech balloon, wherein the identifying of the speech balloon comprises selecting a speech balloon shape from among a plurality of speech balloon shapes pre-stored in the memory of the electronic device;
    inserting the text into the speech balloon having the selected speech balloon shape;
    combining the cartoon strip and the speech balloon with the inserted text to create a cartoon strip image; and
    storing the cartoon strip image in the memory of the electronic device,
    wherein the method further comprises identifying a facial expression of the subject appearing in the moving image content, and
    wherein the selecting of the speech balloon shape comprises selecting the speech balloon shape corresponding to the identified facial expression of the subject from among the pre-stored plurality of speech balloon shapes.

2. The method of claim 1, wherein the identifying of the plurality of still images comprises:

determining a facial expression of persons included in the moving image content based at least on the features related to the eyes of the subject; and identifying the plurality of still images based at least on the determined facial expression.

3. An electronic device for creating a cartoon strip image, the electronic device comprising:

a camera configured to obtain moving image content;

a memory configured to store the moving image content; and at least one processor configured to:

identify a plurality of still images from the moving image content, based at least on analyzing features related to eyes of a subject appearing in the moving image content, the analyzing comprising determining whether the eyes of the subject are open, generate a cartoon strip using the identified still images, identify a speech balloon and text to be included in the speech balloon, wherein the identifying of the speech balloon comprises selecting a speech balloon shape from among a plurality of speech balloon shapes pre-stored in the memory of the electronic device, insert the text into the speech balloon having the selected speech balloon shape, combine the cartoon strip and the speech balloon with the inserted text to create a cartoon strip image, and store the cartoon strip image in the memory, wherein the at least one processor further configured to identify a facial expression of the subject appearing in the moving image content, and wherein the at least one processor selects the speech balloon shape corresponding to the identified facial expression of the subject from among the pre-stored plurality of speech balloon shapes.

4. The electronic device of claim 3, wherein the at least one processor is further configured to:

determine a facial expression of persons included in the moving image content based at least on the features related to the eyes of the subject, and identify the plurality of still images based at least on the determined facial expression.

5. The method of claim 1, wherein the generating of the cartoon strip comprises cropping the identified still images for fitting into panels of the cartoon strip.

6. The method of claim 5, wherein the cartoon strip is generated based on a cartoon strip template selected from among a plurality of cartoon strip templates having different numbers of panels and panels of different dimensions.

7. The method of claim 1, wherein the identifying of the text to be included in the speech balloon comprises identifying text corresponding to a sound made by the subject.

8. The electronic device of claim 3, wherein the at least one processor is further configured to crop the identified still images for fitting into panels of the cartoon strip.

9. The electronic device of claim 8, wherein the cartoon strip is generated based on a cartoon strip template selected from among a plurality of cartoon strip templates having different numbers of panels and panels of different dimensions.

10. The electronic device of claim 3, wherein the at least one processor is further configured to identify text corresponding to a sound made by the subject.

11. A method of an electronic device for creating a cartoon strip image, the method comprising:

obtaining moving image content;

storing the moving image content in a memory of the electronic device;

obtaining a plurality of still images corresponding to frames of the moving image content, the plurality of still images obtained based on analyzing at least one of a highlighted scene or features of a subject appearing in the moving image content, the analyzing of the features of the subject comprising determining whether the eyes of the subject are open;

identifying a speech balloon, and text to be inserted into the speech balloon, wherein the identifying of the speech balloon comprises selecting a speech balloon shape from among a plurality of speech balloon shapes pre-stored in the memory of the electronic device;

inserting the text into the speech balloon having the selected speech balloon shape;

combining a cartoon strip and the speech balloon with the inserted text to create a cartoon strip image; and storing the cartoon strip image in the memory of the electronic device, wherein the method further comprises identifying a facial expression of the subject appearing in the moving image content, and wherein the selecting of the speech balloon shape comprises selecting the speech balloon shape corresponding to the identified facial expression of the subject from among the pre-stored plurality of speech balloon shapes.

12. The method of claim 11, wherein the obtaining of the plurality of still images comprises:

transmitting a request for the plurality of still images to an external server, the request including the moving image; and receiving the plurality of still images from the external server in response to the request.

13. The method of claim 11, wherein the obtaining of the plurality of still images comprises, based on features of the subject appearing in the moving image content, identifying the plurality of still images corresponding to frames of the moving image content.

14. The method of claim 11, wherein the frames of the moving image content comprise frames of the moving image content that are clear and lack blur or noise.

15. The method of claim 11, wherein the features of the subject comprise at least one of:

a direction in which the subject is looking; or an expression of the subject.

16. A non-transitory computer-readable storage medium configured to store one or more computer programs including instructions that, when executed by at least one processor, cause the at least one processor to control to:

obtain moving image content;

store the moving image content in a memory of an electronic device;

obtain a plurality of still images corresponding to frames of the moving image content, the plurality of still images obtained based on analyzing at least one of a highlighted scene or features of a subject appearing in the moving image content, the analyzing of the features of the subject comprising determining whether the eyes of the subject are open;

identify a speech balloon and text to be inserted into the speech balloon, wherein the identifying of the speech balloon comprises selecting a speech balloon shape from among a plurality of speech balloon shapes pre-stored in the memory of the electronic device;

insert the text into the speech balloon having the selected speech balloon shape;

combine a cartoon strip and the speech balloon with the inserted text to create a cartoon strip image; and store the cartoon strip image in the memory of the electronic device, wherein the one or more computer programs further including instructions that, when executed by at least one processor, cause the at least one processor to control to:
- identify a facial expression of the subject appearing in the moving image content, and
- select the speech balloon shape corresponding to the identified facial expression of the subject from among the pre-stored plurality of speech balloon shapes.

* * * * *